US010727736B2

(12) United States Patent
Lee

(10) Patent No.: US 10,727,736 B2
(45) Date of Patent: Jul. 28, 2020

(54) POWER CONVERTING APPARATUS AND HOME APPLIANCE INCLUDING THE SAME

(71) Applicant: LG ELECTRONICS INC., Seoul (KR)

(72) Inventor: Wonwoo Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 16/000,035

(22) Filed: Jun. 5, 2018

(65) Prior Publication Data

US 2018/0358894 A1  Dec. 13, 2018

(30) Foreign Application Priority Data

Jun. 12, 2017  (KR) .......................... 10-2017-0073307

(51) Int. Cl.
*H02M 1/44* (2007.01)
*H02M 1/08* (2006.01)
(Continued)

(52) U.S. Cl.
CPC .............. *H02M 1/44* (2013.01); *H02M 1/08* (2013.01); *H02M 7/53871* (2013.01);
(Continued)

(58) Field of Classification Search
CPC ............ H02M 1/44; H02M 1/08; H02P 27/08
See application file for complete search history.

(56) References Cited

U.S. PATENT DOCUMENTS

| 8,976,551 B2 * | 3/2015 | Igarashi ................. B60L 3/003 363/56.02 |
| 2012/0235611 A1 * | 9/2012 | Kuwabara ............... H02M 1/08 318/400.17 |

(Continued)

FOREIGN PATENT DOCUMENTS

| DE | 10 2015 116 690 | 4/2016 |
| EP | 2 501 030 | 9/2012 |

(Continued)

OTHER PUBLICATIONS

Korean Office Action dated May 29, 2018 issued in Application No. 10-2017-0073307.

(Continued)

*Primary Examiner* — Cortez M Cook
(74) *Attorney, Agent, or Firm* — KED & Associates LLP

(57) ABSTRACT

Disclosed herein are a power converting apparatus and a home appliance having the same. The power converting apparatus according to an embodiment of the present invention includes an inverter having a plurality of upper switching devices and a plurality of lower switching devices, a plurality of upper gate drivers to output a gate drive signal to each of gate terminals of the plurality of upper switching devices, and a plurality of upper ON resistors disposed between the plurality of upper switching devices and the plurality of upper gate drivers, wherein resistance values of the upper ON resistors are different from each other. Thus, electromagnetic interference noise generated when the inverter is turned on or off may be attenuated without changing the switching frequency.

18 Claims, 21 Drawing Sheets

(51) Int. Cl.
*H02P 27/08* (2006.01)
*H02M 7/5387* (2007.01)
*H02M 1/00* (2006.01)

(52) U.S. Cl.
CPC ........ *H02M 7/53875* (2013.01); *H02P 27/08* (2013.01); *H02M 2001/0029* (2013.01)

(56) References Cited

U.S. PATENT DOCUMENTS

| | | | |
|---|---|---|---|
| 2012/0307540 A1* | 12/2012 | Tagome | H02M 1/088 363/131 |
| 2016/0099665 A1 | 4/2016 | Chen et al. | |
| 2017/0110965 A1 | 4/2017 | Osanai et al. | |

FOREIGN PATENT DOCUMENTS

| | | |
|---|---|---|
| JP | 2015-019478 | 1/2015 |
| JP | 2017-079533 | 4/2017 |
| KR | 10-2003-0026211 | 3/2003 |
| KR | 10-2014-0031030 | 3/2014 |
| WO | WO 2015/022860 | 2/2015 |
| WO | WO-2015022860 A1 * | 2/2015 |

OTHER PUBLICATIONS

European Search Report dated Oct. 11, 2018 issued in Application No. 18176400.2.

* cited by examiner

POWER CONVERTING APPARATUS AND HOME APPLIANCE INCLUDING THE SAME

CROSS-REFERENCE TO RELATED APPLICATION

This application claims the priority benefit of Korean Patent Application No. 10-2017-0073307, filed on 12 Jun. 2017, in the Korean Intellectual Property Office, the disclosure of which is incorporated herein by reference.

BACKGROUND OF THE INVENTION

1. Field of the Invention

The present invention relates to a power converting apparatus and a home appliance having the same, and more particularly, to a power converting apparatus capable of attenuating electromagnetic interference (EMI) noise generated when the inverter is turned on or off, and a home appliance having the same.

2. Description of the Related Art

The power converting apparatus is a device that converts supplied power into a power to be output.

One example of the power converting apparatus may be an inverter which converts DC into AC.

The EMI noise occurs when the inverter is turned on or off, specifically, when the switching device is turned on or off.

Various research has been conducted to attenuate such EMI noise.

Korean Patent Application Publication No. 10-2003-0026211 discloses a separate circuit for delaying the frequency modulation phase according to change in the switching frequency to attenuate EMI noise. However, this circuit may cause problems such as increase in complexity, increase in manufacturing cost, and the like.

SUMMARY OF THE INVENTION

Therefore, the present invention has been made in view of the above problems, and it is an object of the present invention to provide a power converting apparatus capable of attenuating electromagnetic interference (EMI) noise generated without changing a switching frequency when an inverter is turned on or off, and a home appliance having the same.

In accordance with an aspect of the present invention, the above and other objects can be accomplished by the provision of a power converting apparatus including an inverter having a plurality of upper switching devices and a plurality of lower switching devices, a plurality of upper gate drivers to output a gate drive signal to each of gate terminals of the plurality of upper switching devices, and a plurality of upper ON resistors disposed between the plurality of upper switching devices and the plurality of upper gate drivers, wherein resistance values of the upper ON resistors are different from each other.

In accordance with another aspect of the present invention, there is provided a power converting apparatus including an inverter having a plurality of upper switching devices and a plurality of lower switching devices, a plurality of upper gate drivers to output a gate drive signal to each of gate terminals of the plurality of upper switching devices, a plurality of upper ON resistors disposed between the plurality of upper switching devices and the plurality of upper gate drivers, and a plurality of upper OFF resistors connected to both ends of each of the upper ON resistors, wherein a resistance value of an upper ON resistor and a resistance value of an upper OFF resistor corresponding to at least one of the upper switching devices are different from each other.

In accordance with a further aspect of the present invention, there is provided a home appliance including an inverter having a plurality of upper switching devices and a plurality of lower switching devices, a plurality of upper gate drivers to output a gate drive signal to each of gate terminals of the plurality of upper switching devices, and a plurality of upper ON resistors disposed between the plurality of upper switching devices and the plurality of upper gate drivers, wherein resistance values of the upper ON resistors are different from each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

A power converting apparatus 220 according to an embodiment of the present invention may include an inverter for driving the motor. Accordingly, the power converting apparatus 220 may be referred to as a motor driving apparatus.

Figure 1:
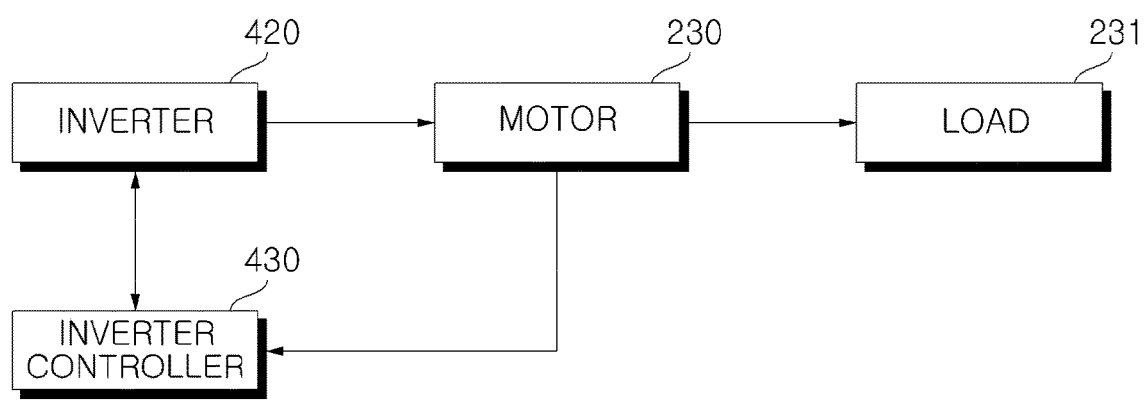
FIG. 1 is an internal block diagram illustrating an example of a power converting apparatus according to an embodiment of the present invention.
Figure 2:
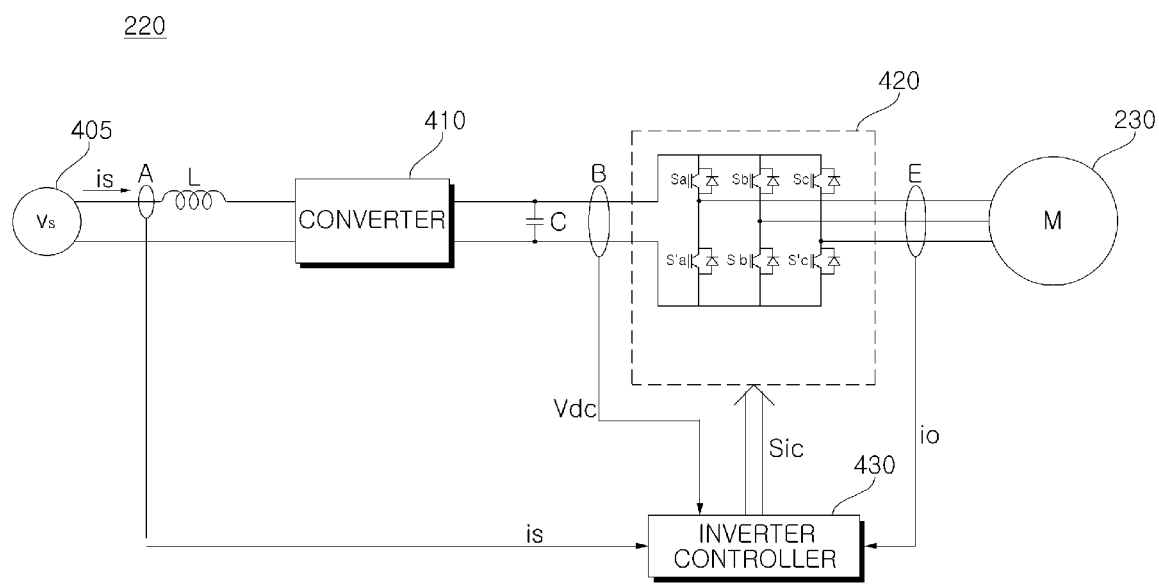
FIG. 2 is an internal circuit diagram of the power converting apparatus of FIG. 1.

FIG. 1 is an internal block diagram illustrating an example of a power converting apparatus according to an embodiment of the present invention, and FIG. 2 is an internal circuit diagram of the power converting apparatus of FIG. 1.

Referring to FIGS. 1 and 2, the power converting apparatus 220 according to an embodiment of the present invention may include a converter 410, a DC capacitor C, an inverter 420, and an inverter controller 430.

The power converting apparatus 220 may further include a DC link voltage detector B and an output current detector E. The power converting apparatus 220 may further include an input current detector A and a reactor L.

The power converting apparatus 220 according to the embodiment of the present invention may use a small capacity DC single capacitor C, which is referred to as "capacitorless". In this case, the voltage across both ends of the DC link capacitor C may be pulsed.

The inverter 420 may include a plurality of upper switching devices and a plurality of lower switching devices.

When the plurality of upper switching devices or the plurality of lower switching devices in the inverter 420 is turned on at the same time, switching waveforms having the same rising time will be generated in the plurality of switching devices. As a result, electromagnetic interference (EMI) noise occurs due to the same rising time.

The present invention proposes a solution to this issue.

The power converting apparatus 220 according to the embodiment of the present invention includes an inverter 220 having a plurality of upper switching devices Sa, Sb, Sc and a plurality of lower switching devices S'a, S'b, S'c, a plurality of upper gate drivers GDa, GDb, GDc for outputting a gate drive signal to each of gate terminals of the upper switching devices Sa,Sb,Sc, and a plurality of upper ON resistors Raon, Rbon, Rcon disposed between the plurality of upper switching devices Sa, Sb, Sc and the plurality of upper gate drivers GDa, GDb, GDc, wherein resistance values of the upper ON resistors Raon, Rbon, Rcon are different from each other. Accordingly, the EMI noise generated when the inverter 420 is turned on or off may be attenuated without changing the switching frequency.

Particularly, when the plurality of upper switching devices Sa, Sb, Sc is turned on, the rising times of the switching waveforms by the plurality of upper ON resistors Raon, Rbon, Rcon are set to be different from each other, and accordingly the EMI noise generated in the switching waveforms is attenuated.

The power converting apparatus 220 further includes a plurality of upper OFF resistors Raoff, Rboff, Rcoff connected to both ends of each of the ON resistors Raon, Rbon, Rcon, respectively. If the resistance values of the upper OFF resistors Raoff, Rboff, Rcoff are different from each other, the falling times of the switching waveforms by the plurality of upper OFF resistors Raoff, Rboff, Rcoff are set to be different from each other when the plurality of upper switching devices is turned off. Thereby, the EMI noise generated in the switching waveforms is attenuated.

The power converting apparatus 220 further includes a plurality of lower ON resistors Ra'on, Rb'on, Rc'on disposed between the plurality of lower switching devices S'a, S'b, S'c and the lower gate driver GDx. If the resistance values of the lower ON resistors Ra'on, Rb'on, Rc'on are different from each other, the rising times of the switching waveforms by the plurality of lower ON resistors Ra'on, Rb'on, Rc'on are set to be different from each other when the plurality of lower switching devices S'a, S'b, S'c is turned on. Thereby, the EMI noise generated in the switching waveforms is attenuated.

The power converting apparatus 220 further includes a plurality of lower OFF resistors Ra'off, Rb'off, Rc'off connected to both ends of each of the lower ON resistors Ra'on, Rb'on, Rc'on, respectively. If the resistance values of the lower OFF resistors Ra'off, Rb'off, Rc'off are different from each other, the falling times of the switching waveforms by the plurality of lower OFF resistors Ra'off, Rb'off, Rc'off are set to be different from each other when the plurality of lower switching devices S'a, S'b, S'c is turned off. Thereby, the EMI noise generated in the switching waveforms is attenuated.

According to another embodiment of the present invention, a power converting apparatus 220 includes an inverter 420 having a plurality of upper switching devices Sa, Sb, Sc and a plurality of lower switching devices S'a, S'b, S'c, a plurality of upper gate drivers GDa, GDb, GDc for outputting a gate drive signal to each of gate terminals of the plurality of upper switching devices Sa, Sb, Sc, a plurality of upper ON resistors Raon, Rbon, Rcon disposed between the plurality of upper switching devices Sa, Sb, Sc and the plurality of upper gate drivers GDa, GDb, GDc, and a plurality of upper OFF resistors Raoff, Rboff, Rcoff connected to both ends of each of the upper ON resistors Raon, Rbon, Rcon, wherein the resistance value of an upper ON resistor Raon, Rbon, Rcon and the resistance value of an upper OFF resistor Raoff, Rboff, Rcoff corresponding to at least one of the upper switching devices Sa, Sb, Sc are different from each other. Thus, the EMI noise generated when the inverter 420 is turned on or off may be attenuated without changing the switching frequency.

Hereinafter, operations of respective constituent units in the power converting apparatus 220 of FIGS. 1 and 2 will be described.

The reactor L is disposed between a commercial AC power source 405 ($v_s$) and the converter 410 to perform power factor correction or voltage boost. The reactor L may also function to restrict a harmonic current according to high-speed switching of the converter 410.

The input current detector A may detect input current $i_s$ that is input from the commercial AC power source 405. To this end, a current transformer (CT) or a shunt resistor may be used as the input current detector A. The detected input current $i_s$, which is a discrete signal in the form of a pulse, may be input to the inverter controller 430.

The converter 410 converts the commercial AC power 405 applied via the reactor L into DC power and outputs the DC power. While the commercial AC power 405 is illustrated as a single-phase AC power, 3-phase AC power may be employed as the commercial AC power 405. The internal structure of the converter 410 depends on the type of the commercial AC power source 405.

The converter 410 may be configured by diodes without a switching device. In this case, the converter 410 may perform the rectification operation without performing a separate switching operation.

For example, when the applied power is single-phase AC power, 4 diodes may be used in the form of a bridge. When the applied power is 3-phase AC power, 6 diodes may be used in the form of a bridge.

As the converter 410, a half-bridge converter formed by connecting, for example, 2 switching devices and 4 diodes may be used. When 3-phase AC power is employed, 6 switching devices and 6 diodes may be used. In this case, the converter 410 may be referred to as a rectifier.

When the converter 410 is provided with switching devices, the converter 410 may perform voltage boost, power factor improvement and DC power conversion according to the switching operation of the switching devices.

The DC link capacitor C smooths and stores input power. While the figure illustrates that one DC link capacitor C is used, a plurality of DC link capacitors may be provided to secure device stability.

While the DC link capacitor C is illustrated as being connected to the output terminal of the converter 410, embodiments of the present invention are not limited thereto. DC power may be directly applied to the DC link capacitor C. For example, DC power from a solar cell may be directly input to the DC link capacitor C or input to the DC link capacitor C via DC-DC conversion. Hereinafter, description will be given based on details shown in the figures.

As DC power is stored in the DC link capacitor C, both ends of the DC link capacitor C may be referred to as DC ends or DC link ends.

The DC link voltage detector B may detect a DC link voltage Vdc between both ends of the DC link capacitor C. To this end, the DC link voltage detector B may include a resistor device and an amplifier. The detected DC link voltage Vdc may be input to the inverter controller 430 as a discrete signal in the form of a pulse.

The inverter 420 may include a plurality of inverter switching devices. Thereby, the inverter 420 may convert the rectified DC power Vdc into 3-phase AC powers va, vb, and vc of predetermined frequencies according to turning on/off of the switching devices and output the converted powers to a 3-phase synchronous motor 230.

The inverter 420 includes upper switching devices Sa, Sb and Sc and lower switching devices S'a, S'b and S'c. Each of the upper switching devices Sa, Sb, Sc and a corresponding lower switching device S'a, S'b, S'c are connected in series to form a pair. Three pairs of upper and lower switching devices Sa and S'a, Sb and S'b, and Sc and S'c are connected in parallel. Each of the switching devices Sa, S'a, Sb, S'b, Sc and S'c is connected with a diode in an antiparallel manner.

Each of the switching devices in the inverter 420 is turned on/off based on an inverter switching control signal Sic from the inverter controller 430. Thereby, 3-phase AC power having a variable frequency is output to the 3-phase synchronous motor 230.

The inverter controller 430 may control the switching operation of the inverter 420 in a sensorless manner. To this end, the inverter controller 430 may receive an output current io detected by the output current detector E.

In order to control the switching operation of the inverter 420, the inverter controller 430 outputs the inverter switching control signal Sic to the inverter 420. The inverter switching control signal Sic is a pulse width modulated (PWM) switching control signal. The inverter switching control signal Sic is generated and output based on the output current io detected by the output current detector E. The operation of outputting the inverter switching control signal Sic from the inverter controller 430 will be described in detail with reference to FIG. 3 later in this specification.

The output current detector E may detect a phase current, namely, the output current io, flowing through the 3-phase motor 230.

As shown in the figures, the output current detector E may be disposed between the inverter 420 and the motor 230 to detect a current flowing to the motor 230.

As shown in the figures, the output current detector E may include three resistors. The output current detector E may detect phase currents ia, ib, ic which are the output currents io flowing through the motor 230. The detected output currents ia, ib, ic may be applied to the inverter controller 430 as a discrete signal in the form of a pulse. Based on the detected output currents ia, ib, ic, an inverter switching control signal Sic is generated.

In the present specification, ia, ib, ic and io are interchangeably used to refer to an output current.

Unlike the drawings, the output current detector E may have two resistors. The phase current of the remaining one phase may be calculated using three-phase equilibrium.

Unlike the drawings, the output current detector E may be disposed between the DC link capacitor C and the inverter 420 and include a single shunt resistor Rs to detect a current flowing to the motor 230. This scheme may be referred to as a one-shunt scheme.

According to the one-shunt scheme, the output current detector E may use one shunt resistor Rs to detect a phase current, which is the output current idc flowing to the motor 230, through time division when the lower switching devices of the inverter 420 are turned on.

The detected output current io, which is a discrete signal in the form of a pulse, may be applied to the inverter controller 430. An inverter switching control signal Sic may be generated based on the detected output current io.

The 3-phase motor 230 includes a stator and a rotor. The rotor rotates when AC current of a phase of a predetermined frequency is applied to a coil of a corresponding phase (of phases a, b and c) of the stator.

The motor 230 may include, for example, a Surface-Mounted Permanent-Magnet Synchronous Motor (SMPMSM), an Interior Permanent Magnet Synchronous Motor (IPMSM), and a Synchronous Reluctance Motor (SynRM). The SMPMSM and the IPMSM are Permanent Magnet Synchronous Motors (PMSM) employing permanent magnets, while the SynRM does not have a permanent magnet.

Figure 3:
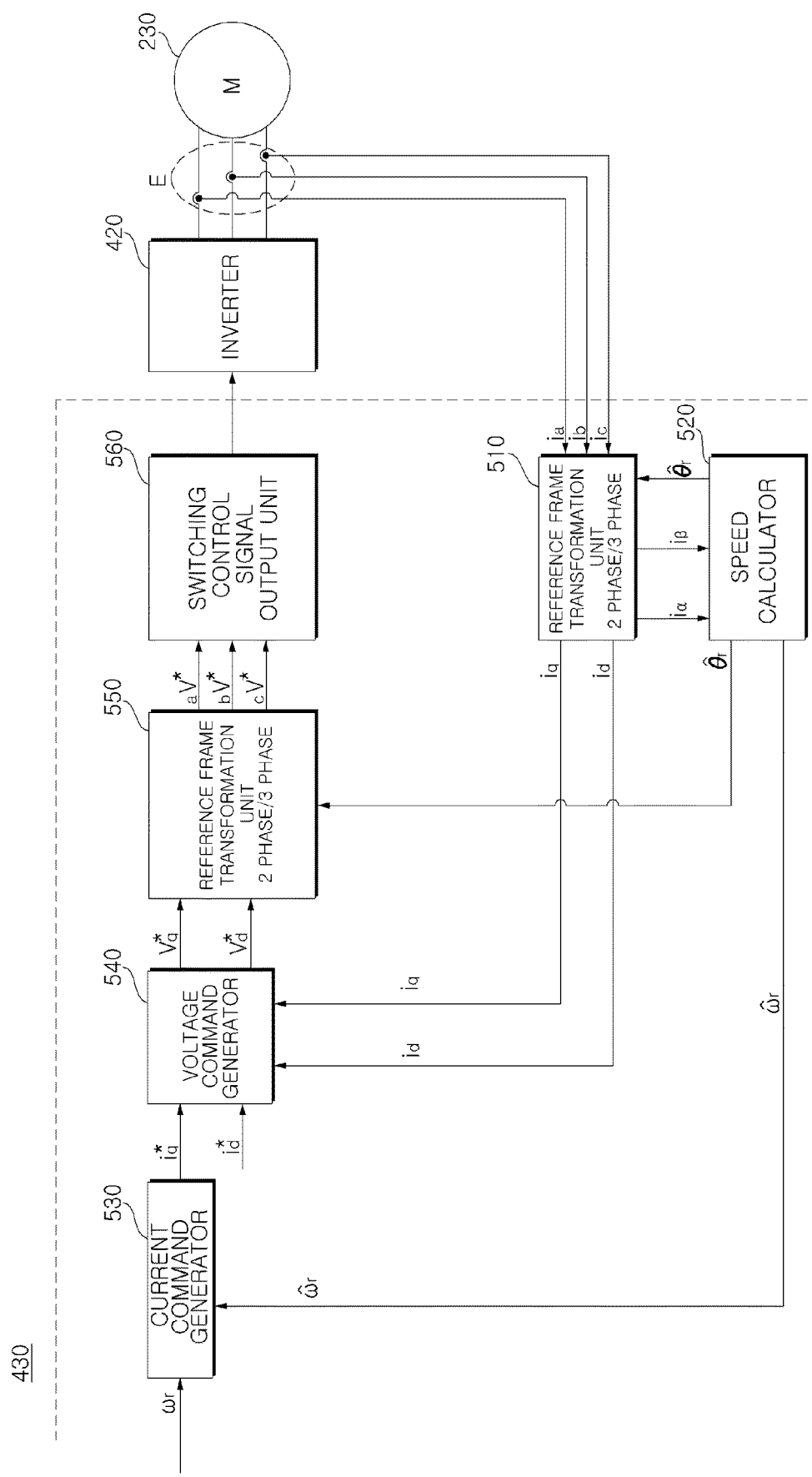
FIG. 3 is an internal block diagram illustrating the inverter controller of FIG. 2.

FIG. 3 is an internal block diagram illustrating the inverter controller of FIG. 2.

Referring to FIG. 3, the inverter controller 430 may include a reference frame transformation unit 510, a speed calculator 520, a current command generator 530, a voltage command generator 540, a reference frame transformation unit 550, and a switching control signal output unit 560.

The reference frame transformation unit 510 may transform the output currents (ia, ib, ic) detected by the output current detector E into 2-phase currents (iα, iβ) in a stationary reference frame.

The reference frame transformation unit 510 may transform 2-phase currents (iα, iβ) in the stationary reference frame to 2-phase currents (id, iq) in a rotating reference frame.

The speed calculator 520 may estimate a position $\hat{\theta}_r$ based on the output currents (ia, ib, ic) detected by the output current detector E, and calculate a speed $\hat{\omega}_r$ using the derivative of the estimated position.

The current command generator 530 generates a current command value $i^*_q$ based on the calculated speed $\hat{\omega}_r$ and a speed command value $\omega^*_r$. For example, the current command generator 530 may perform PI control in a PI controller 335 and generate the current command value $i^*_q$ based on the difference between the calculated speed $\hat{\omega}_r$ and the speed command value $\omega^*_r$. While FIG. 3 illustrates a q-axis current command value $i^*_q$ as a current command value, a d-axis current command value $i^*_d$ may also be generated. The d-axis current command value $i^*_d$ may be set to 0.

The current command generator 530 may further include a limiter (not shown) for limiting the level of the current command value $i^*_q$ such that the current command value $i^*_q$ does not exceed an allowable range.

Next, the voltage command generator 540 generates d-axis and q-axis voltage command values $v^*_d$ and $v^*_q$ based on the d-axis and q-axis currents $i_d$ and $i_q$ which are transformed into currents in the 2-phase rotating reference frame by the reference frame transformation unit and the current command values $i^*_d$ and $i^*_q$ from the current command generator 530. For example, the voltage command generator 540 may perform PI control in a PI controller 344 and generate a q-axis voltage command value $v^*_q$ based on the difference between the q-axis current $i_q$ and the q-axis current command value $i^*_q$. In addition, the voltage command generator 540 may perform PI control in a PI controller 348 and generate the d-axis voltage command value $v^*_d$ based on the difference between the d-axis current $i_d$ and the d-axis current command value $i^*_d$. The voltage command generator 540 may further include a limiter (not shown) for limiting the levels of the d-axis and q-axis voltage command values $v^*_d$ and $v^*_q$ such that the d-axis and q-axis voltage command values $v^*_d$ and $v^*_q$ do not exceed an allowable range.

The generated d-axis and q-axis voltage command values v*d and v*q are input to the reference frame transformation unit 550.

The reference frame transformation unit 550 receives the position $\hat{\theta}_r$ calculated by the speed calculator 520 and the d-axis and q-axis voltage command values $v^*_d$ and $v^*_q$ and performs reference frame transformation.

The reference frame transformation unit 550 transforms a 2-phase rotating reference frame into a 2-phase stationary reference frame. The transformation may be performed using the position $\hat{\theta}_r$ calculated by the speed calculator 520.

The reference frame transformation unit 550 may also transform the 2-phase stationary reference frame into a 3-phase stationary reference frame. Through such transformation, the reference frame transformation unit 550 outputs 3-phase output voltage command values v*a, v*b, and v*c.

The switching control signal output unit 560 outputs a PWM inverter switching control signal Sic based on the 3-phase output voltage command values v*a, v*b, and v*c.

The output inverter switching control signal Sic is transformed into a gate drive signal in a gate drivers (not shown) and then input to the gate of each switching device in the inverter 420. Thereby, the switching devices Sa, S'a, Sb, S'b, Sc, and S'c in the inverter 420 perform the switching operation.

Figure 4A:
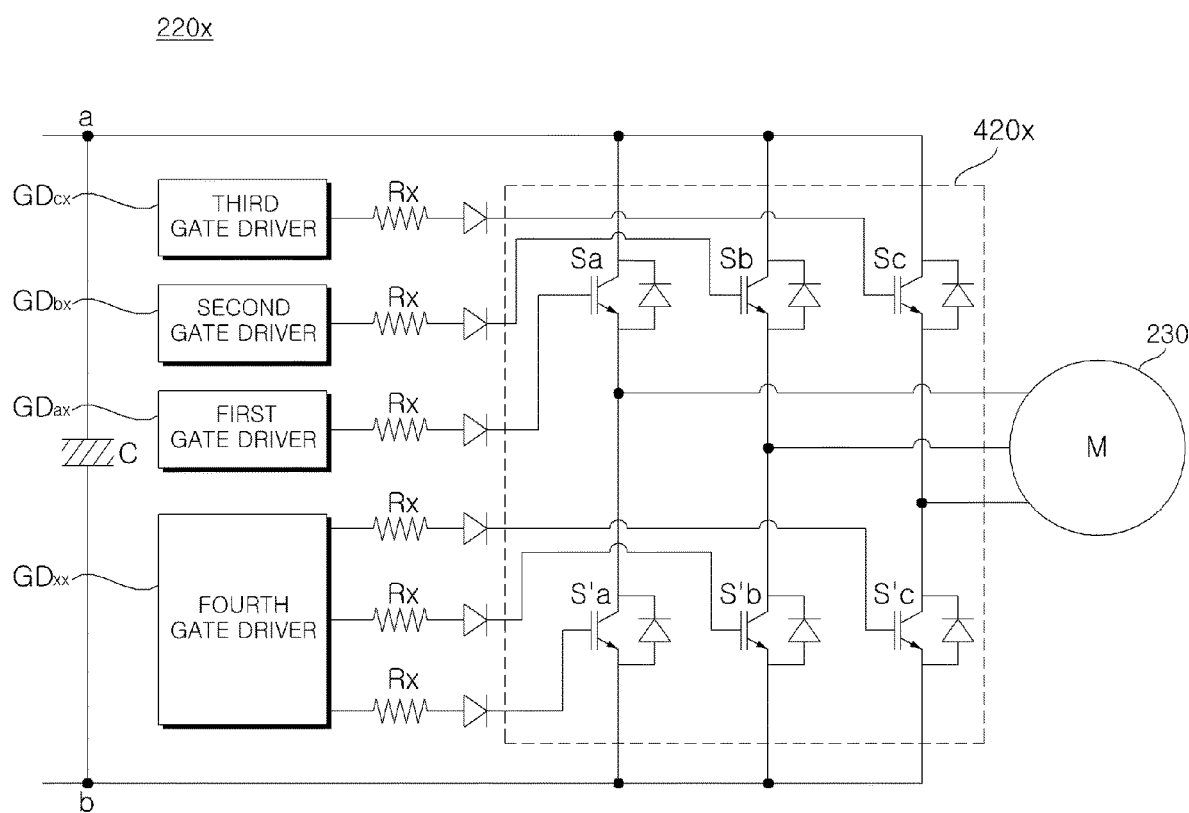
FIGS. 4A to 4C illustrate operation of a conventional power converting apparatus.
Figure 4B:
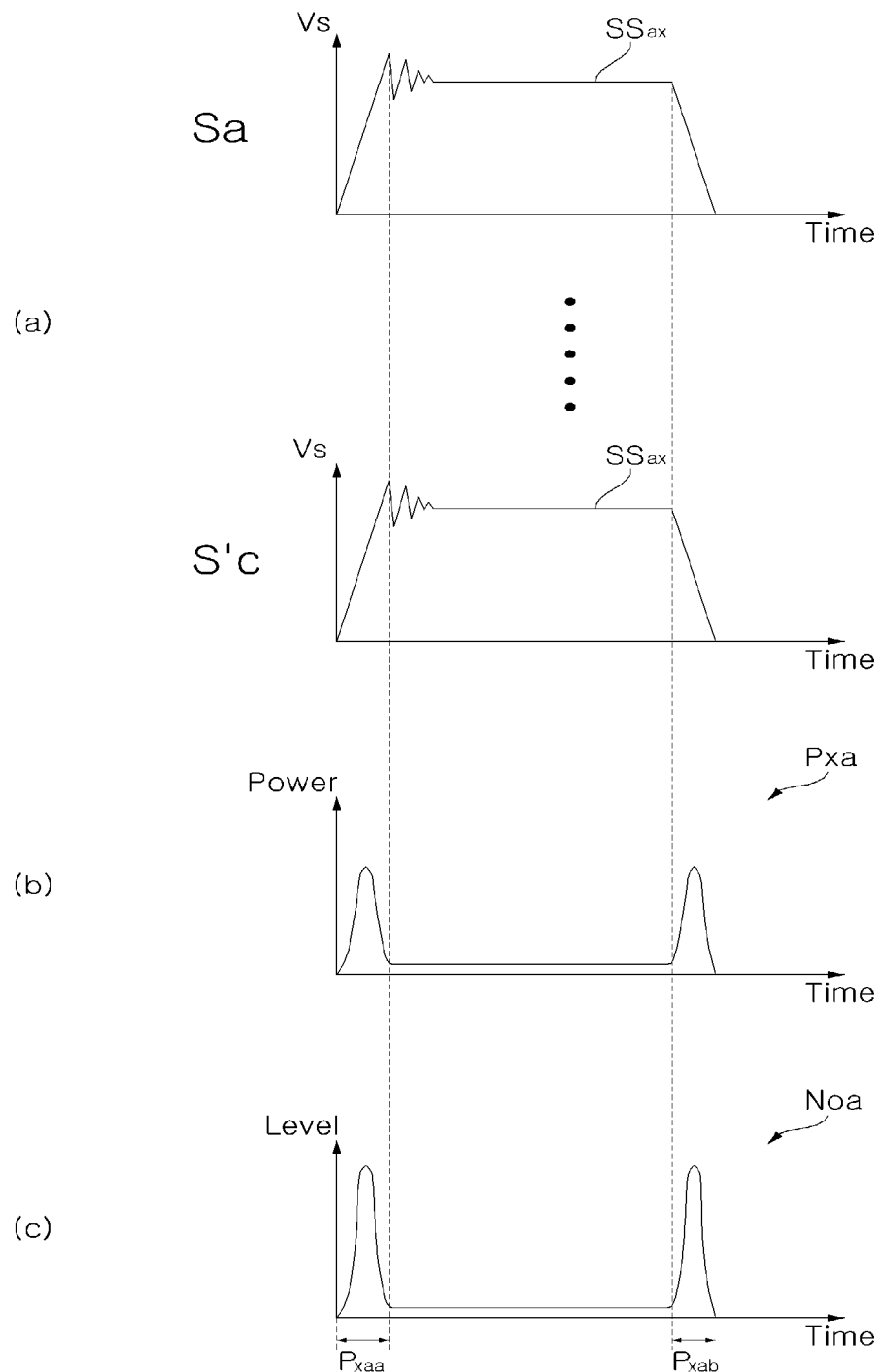
Figure 4C:
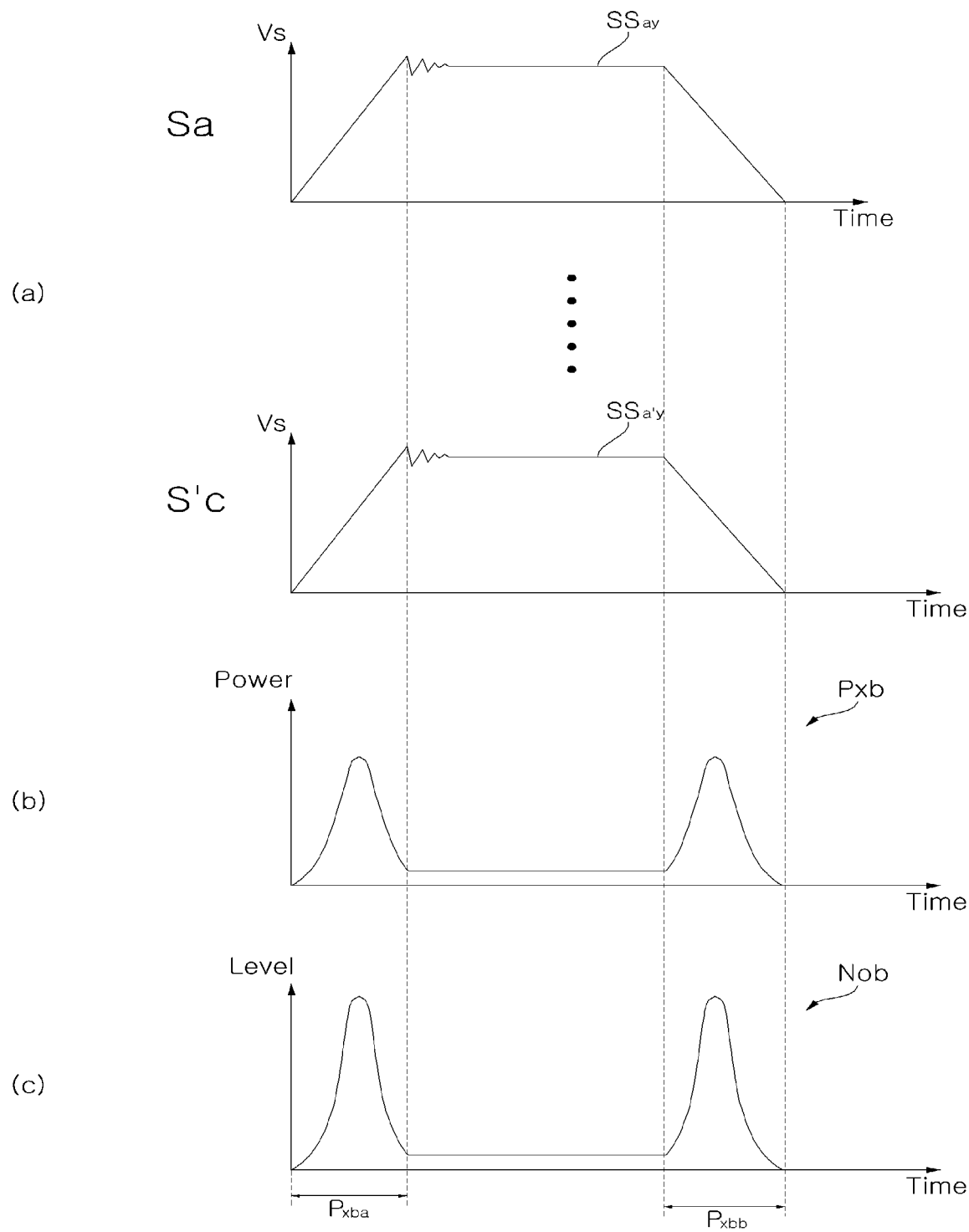

FIGS. 4A to 4C illustrate operation of a conventional power converting apparatus.

FIG. 4A is a diagram illustrating a conventional power converting apparatus 220x.

Each resistor Rx may be disposed between an inverter 420x having a plurality of upper switching devices Sa to Sc and lower switching devices S'a to S'c and a plurality of gate drivers GDax, GDcx, GDcx and GDxx. Here, the resistors Rx may have the same resistance value.

If the resistors Rx have the same resistance value, when the plurality of switching devices Sa to Sc and S'a to S'c is turned on by the gate drive signals output from the plurality of gate drivers GDax, GDbx, GDcx, GDxx, the rising times of the switching waveforms are all the same during the Pxaa period as shown in FIG. 4B.

Accordingly, during the Pxaa period, the level of power Pxa consumed in the plurality of switching devices is rapidly increased as shown in FIG. 4B(b), and the level of EMI noise Noa is rapidly increased as shown in FIG. 4B(c). That is, there may be a problem of rapid increase in EMI noise during the Pxaa period.

If the resistors Rx have the same resistance value, when the plurality of switching devices Sa to Sc and S'a to S'c is turned off by the gate drive signals output from the plurality of gate drivers GDax, GDbx, GDcx, GDxx, the fall times of the switching waveforms are all the same during the Pxab period as shown in FIG. 4B.

Accordingly, during the Pxab period, the level of power Pxa consumed in the plurality of switching devices is rapidly increased as shown in FIG. 4B(b), and the level of EMI noise Noa is rapidly increased as shown in FIG. 4B(c). That is, there may be a problem of rapid increase in EMI noise during the Pxab period.

Similar to FIG. 4B, FIG. 4C illustrates a case where, when the plurality of switching devices Sa to Sc and S'a to S'c is turned on or off, that is, during the Pxba period or Pxbb period, the level of power Pxb consumed in the plurality of switching devices is rapidly increased, and the level of EMI noise Nob is rapidly increased.

The switching speed of the plurality of switching devices Sa to Sc and S'a to S'c in FIG. 4B is greater than that in FIG. 4C. In this case, switching loss, namely, power consumption, is reduced, but the level of EMI noise is raised, which is a disadvantage.

On the other hand, the switching speed of the plurality of switching devices Sa to Sc and S'a to S'c in FIG. 4C is less than that of FIG. 4B. In this case, the level of EMI noise is lowered, but power consumption increases, which is a disadvantage.

Accordingly, in the present invention, the resistance values of the resistors disposed between the plurality of switching devices Sa to Sc and S'a to S'c and the gate drivers are set to be different from each other such that at least a part of the rising times of the switching waveforms is varied. Details will be described with reference to FIG. 5 and the following figures.

Figure 5:
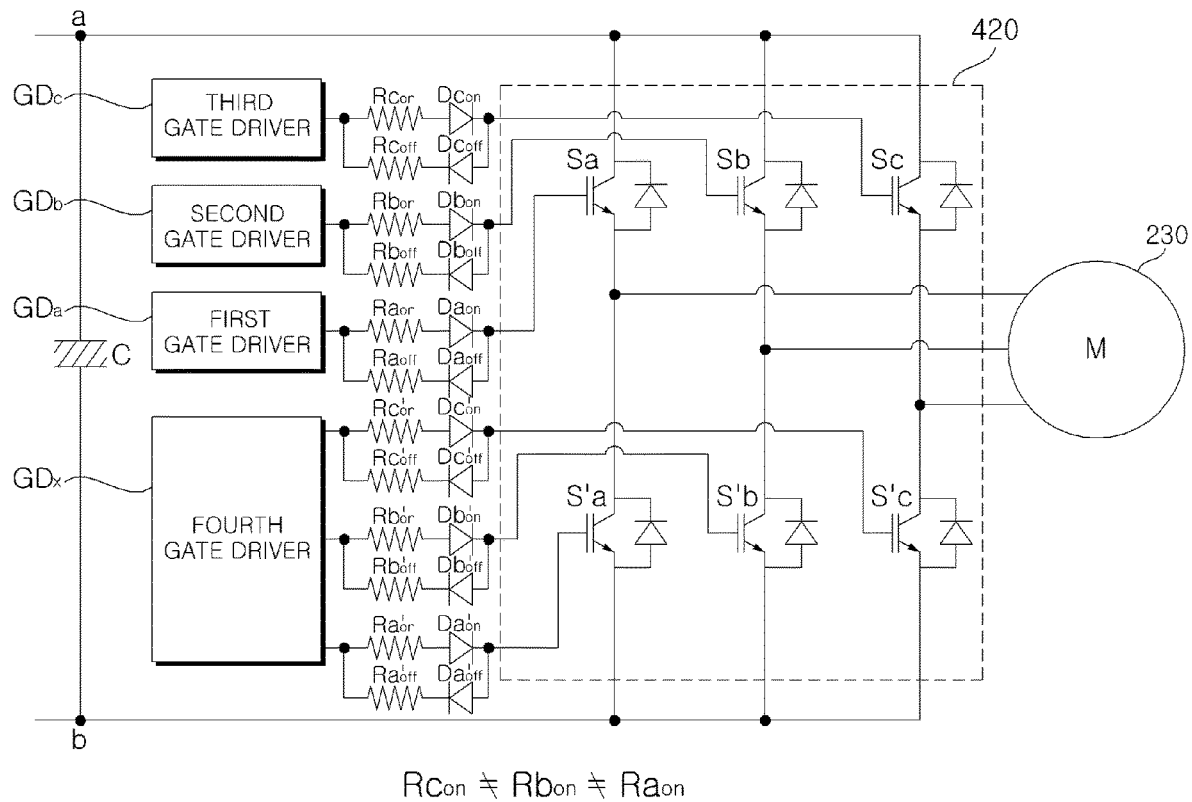
FIG. 5 is a diagram illustrating a power converting apparatus according to an embodiment of the present invention.
Figure 6:
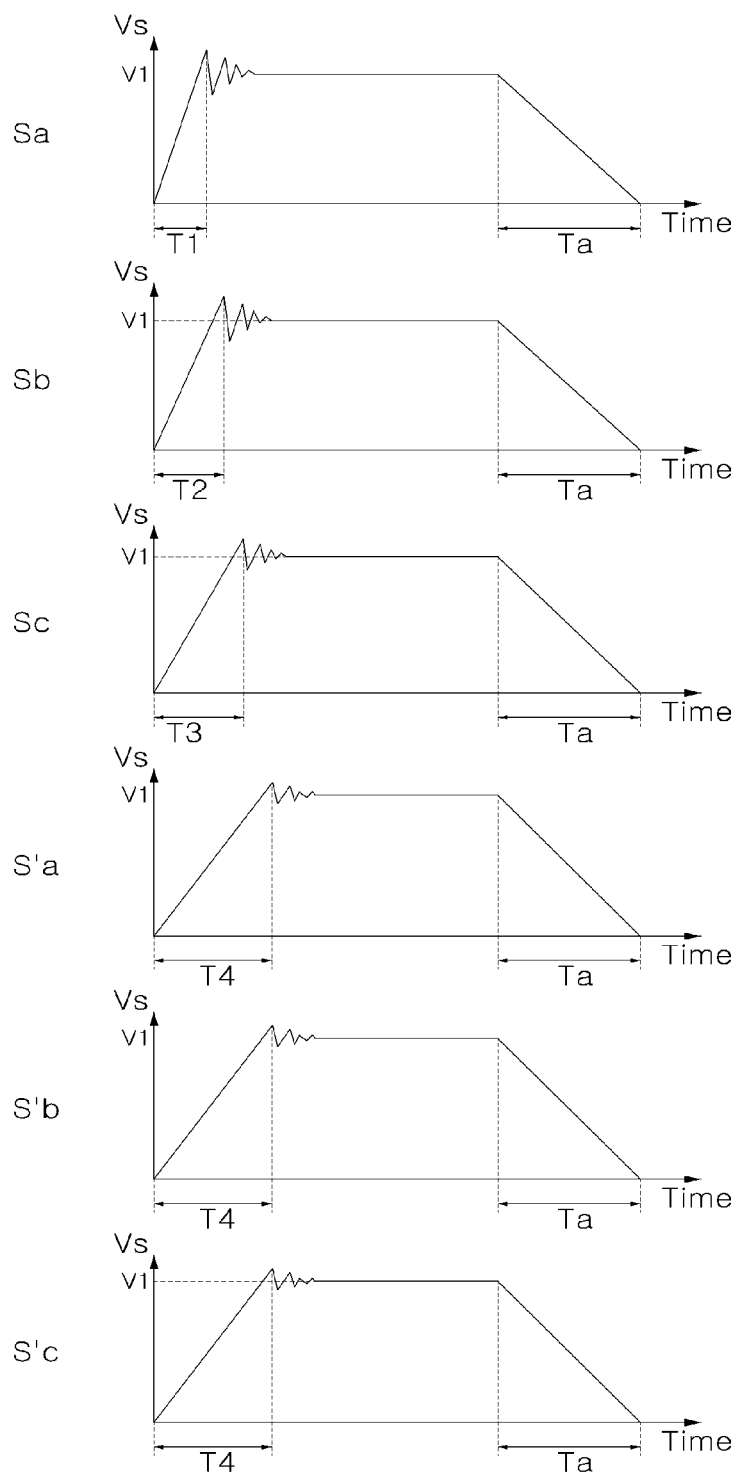
FIG. 6 illustrates operation of the power converting apparatus of FIG. 5.

FIG. 5 is a diagram illustrating a power converting apparatus according to an exemplary embodiment of the present invention, and FIG. 6 illustrates operation of the power converting apparatus of FIG. 5.

Referring to FIGS. 5 and 6, a power converting apparatus 220a includes an inverter 420 having a plurality of upper switching devices Sa, Sb and Sc and a plurality of lower switching devices S'a, S'b and S'c, a plurality of upper gate drivers GDa, GDb and GDc for outputting a gate drive signal to each of gate terminals of the plurality of upper switching devices Sa, Sb and Sc, and a plurality of upper ON resistors Raon, Rbon and Rcon disposed between the plurality of upper switching devices Sa, Sb and Sc and the plurality of upper gate drivers GDa, GDb and GDc, wherein resistance values of the upper ON resistors Raon, Rbon and Rcon are different from each other.

A plurality of upper OFF resistors Raoff, Rboff and Rcoff may be connected to both ends of each of the upper ON resistors Raon, Rbon and Rcon. The resistance values of the upper OFF resistors Raoff, Rboff and Rcoff may be equal to each other.

Specifically, the plurality of upper resistors Raon, Rbon and Rcon and a plurality of upper ON diodes Daon, Dbon and Dcon are disposed between the plurality of upper switching devices Sa, Sb and Sc and the plurality of upper gate drivers GDa, GDb and GDc.

In addition, the plurality of upper OFF resistors Raoff, Rboff and Rcoff and a plurality of upper OFF diodes Daoff, Dboff and Dcoff may be disposed between both ends of each of the upper ON resistors Raon, Rbon and Rcon and each of the upper ON diodes Daon, Dbon and Dcon.

The plurality of upper gate drivers GDa, GDb and GDc, that is, the first to third gate drivers GDa, GDb and GDc may output gate drive signals to the upper switching devices Sa, Sb and Sc, respectively.

The resistance values of the upper ON resistors Raon, Rbon and Rcon are different from each other, and therefore when the plurality of upper switching devices Sa, Sb and Sc is turned on, the rising times T1, T2, and T3 thereof may be different from each other. As a result, the switching waveforms flowing through the plurality of upper switching devices Sa, Sb and Sc share a smaller overlapped portion, and therefore the EMI noise is attenuated.

The power inverter 220a of FIG. 5 may further include a lower gate driver GDx for outputting a gate drive signal to the gate terminals of the plurality of lower switching devices S'a, S'b and S'c, and a plurality of lower ON resistors Ra'on, Rb'on and Rc'on disposed between the plurality of lower switching devices S'a, S'b and S'c and the lower gate driver GDx.

Here, the lower ON resistors Ra'on, Rb'on and Rc'on may all have the same resistance value.

The power inverter 220a of FIG. 5 may further include a plurality of lower OFF resistors Ra'off, Rb'off and Rc'off connected to both ends of each of the lower ON resistors Ra'on, Rb'on and Rc'on, respectively.

Specifically, the plurality of lower resistors Ra'on, Rb'on and Rc'on and a plurality of lower ON diodes Da'on, Db'on and Dc'on are disposed between the plurality of lower switching devices S'a, S'b, and S'c and the lower gate driver GDx.

In addition, the plurality of lower OFF resistors Ra'off, Rb'off and Rc'off and a plurality of lower OFF diodes Da'off, Db'off and Dc'off may be disposed between both ends of each of the lower ON resistors Ra'on, Rb'on and Rc'on and each of the lower ON diodes Da'on, Db'on and Dc'on.

The lower gate driver GDx, that is, the fourth gate driver GDx, may output gate drive signals to the plurality of lower switching devices S'a, S'b and S'c, respectively.

The lower ON resistors Ra'on, Rb'on and Rc'on have the same resistance value, and therefore when the plurality of lower switching devices S'a, S'b and S'c is turned on, the rising times thereof may be equal to T4.

Meanwhile, the resistance value of the plurality of lower ON resistors Ra'on, Rb'on and Rc'on may be different from the resistance value of the plurality of upper ON resistors Raon, Rbon and Rcon.

As a result, the switching waveforms flowing through the plurality of upper ON resistors Raon, Rbon and Rcon and the plurality of lower switching devices S'a, S'b, and S'c share a smaller overlapping portion, and therefore the EMI noise is attenuated.

Figure 7:
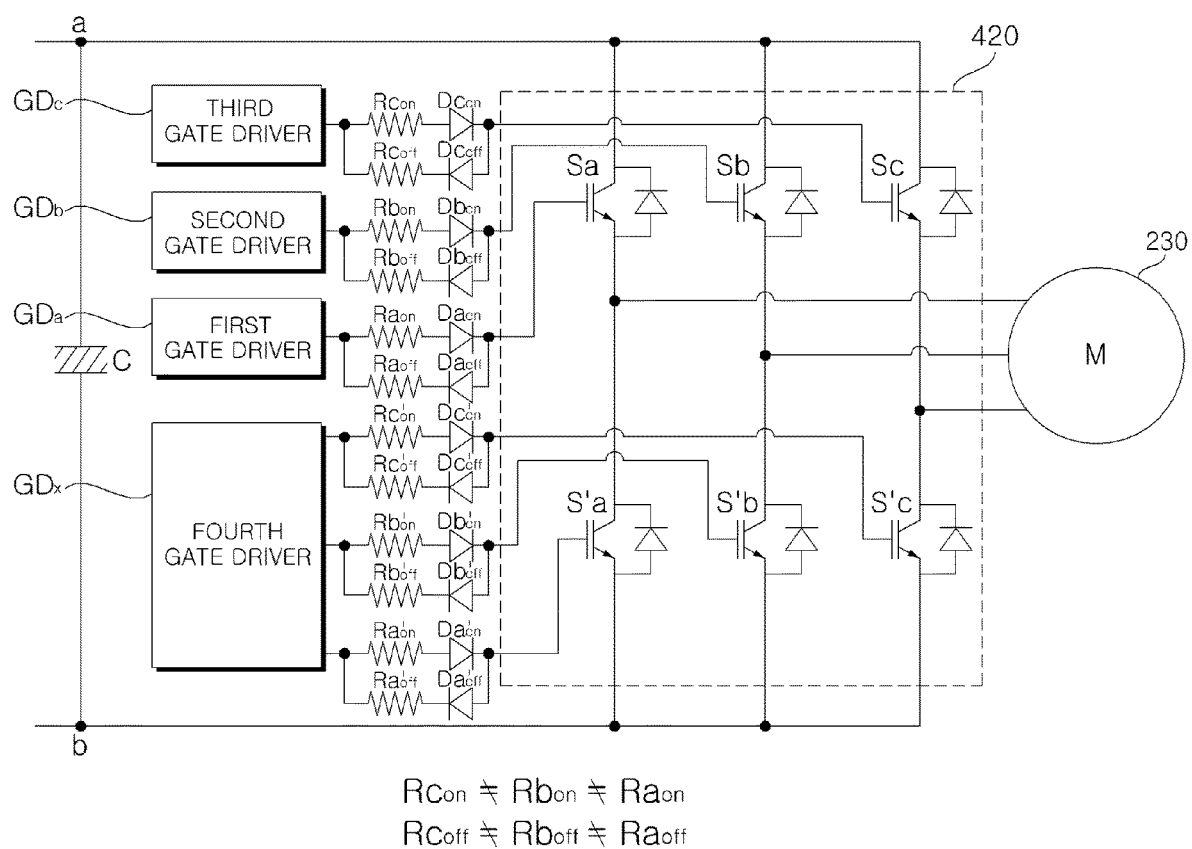
FIG. 7 is a diagram illustrating a power converting apparatus according to another embodiment of the present invention.
Figure 8:
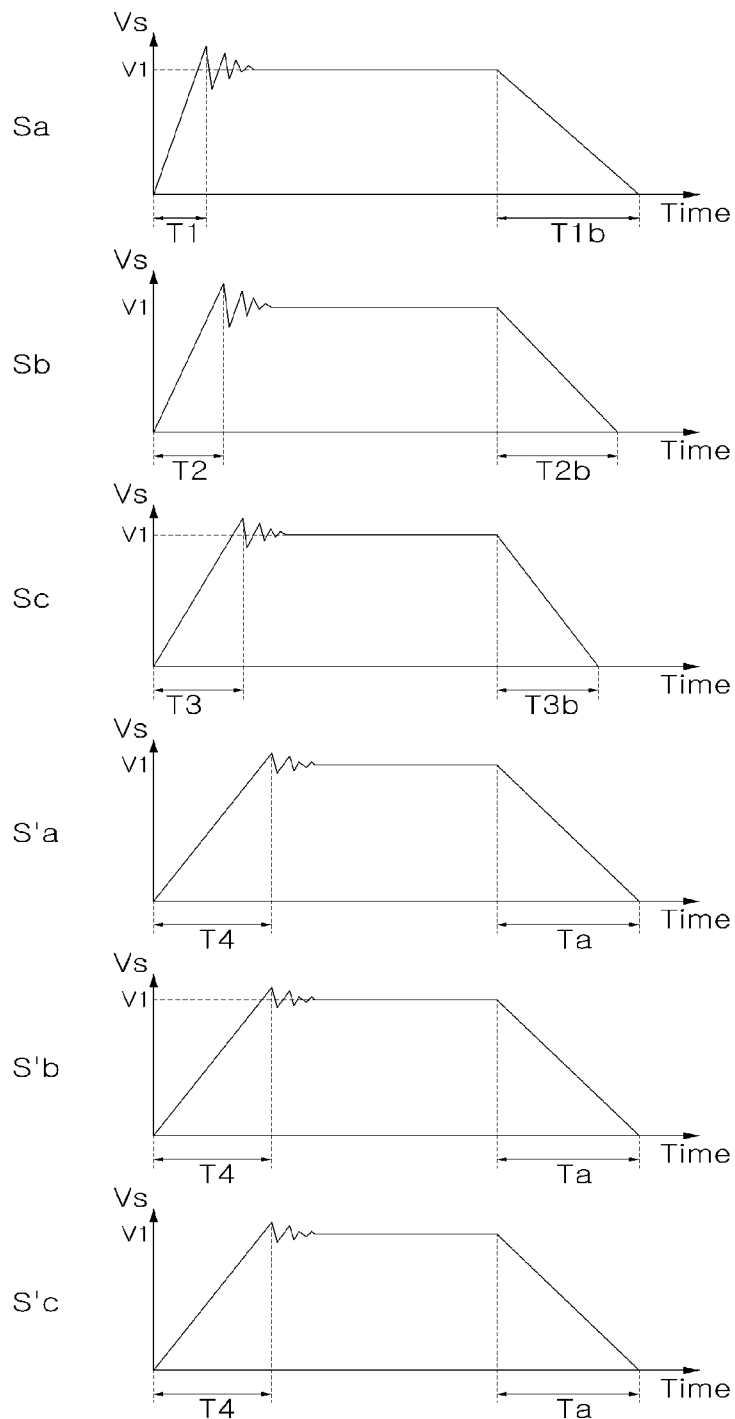
FIG. 8 illustrates operation of the power converting apparatus of FIG. 7.

FIG. 7 is a diagram illustrating a power converting apparatus according to another embodiment of the present invention, and FIG. 8 illustrates operation of the power converting apparatus of FIG. 7.

Referring to FIGS. 7 and 8, the power converting apparatus 220a of FIG. 7 is similar to the power converting apparatus 220a of FIG. 5, except that the resistance values of the upper ON resistors Raon, Rbon, and Rcon are different from each other, and the resistance values of the upper OFF resistors Raoff, Rboff and Rcoff are different from each other.

Since the resistance values of the upper resistors Raoff, Rboff and Rcoff are different from each other, different falling times T1b, T2b and T3b are given when the plurality of upper switching switches Sa, Sb and Sc is turned off, as shown in FIG. 8. Accordingly, the switching waveforms flowing through the plurality of upper switching devices Sa, Sb and Sc share a smaller overlapping portion, and therefore the EMI noise is attenuated.

Figure 9:
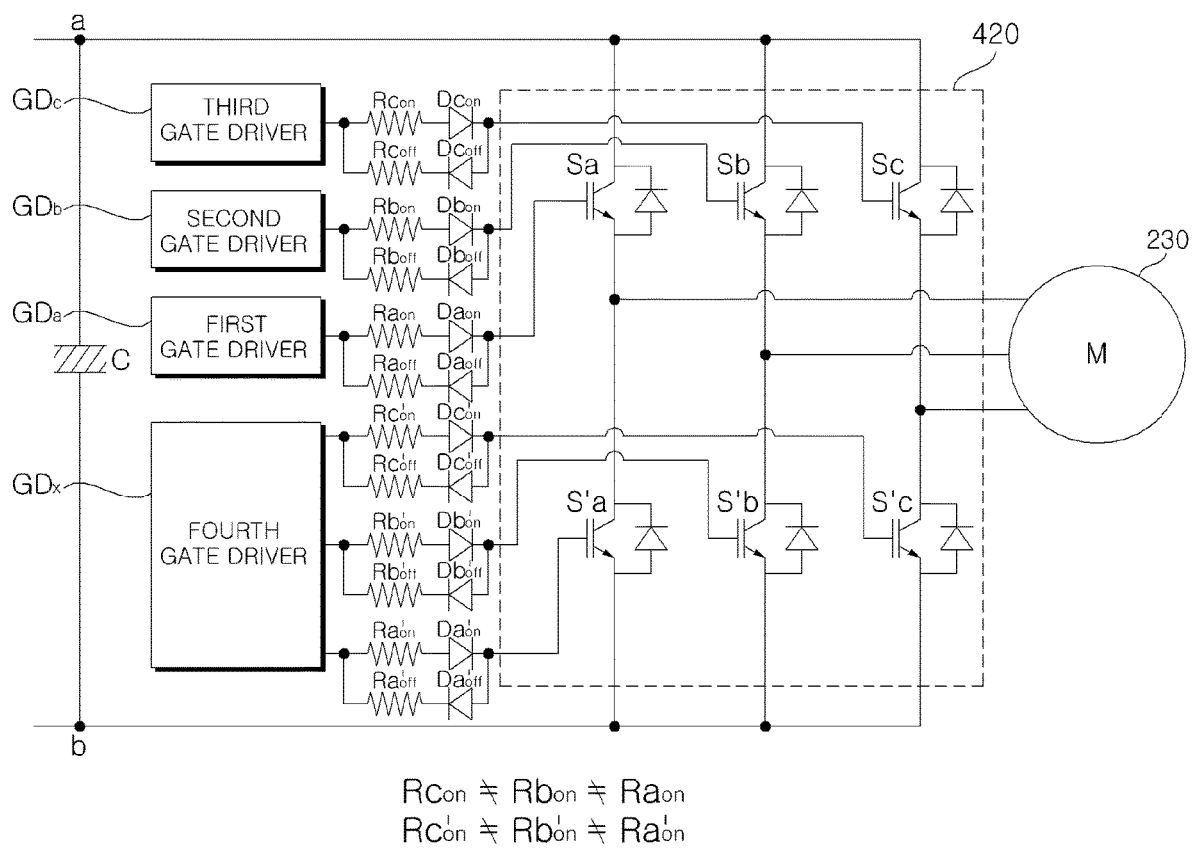
FIG. 9 is a diagram illustrating a power converting apparatus according to still another embodiment of the present invention.
Figure 10:
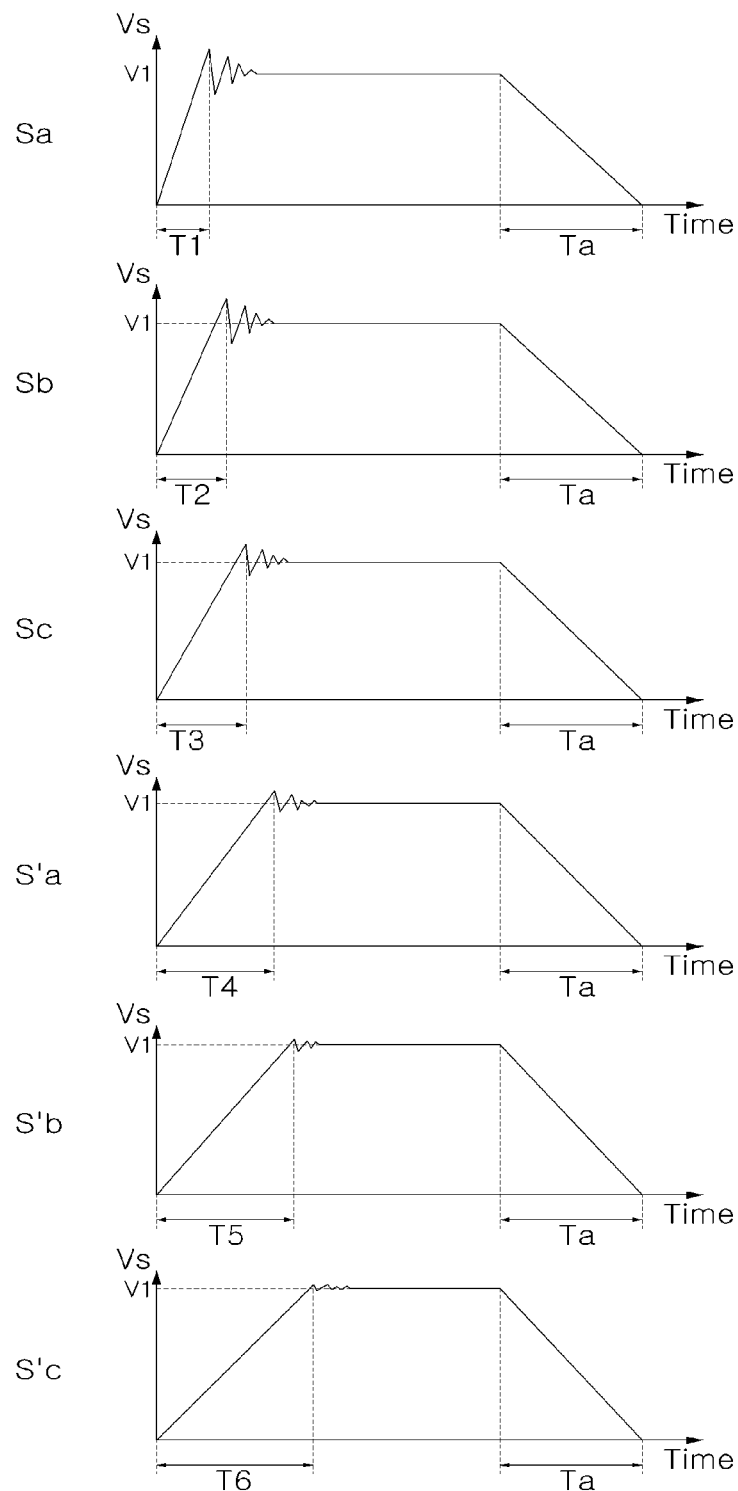
FIG. 10 illustrates operation of the power converting apparatus of FIG. 9.

FIG. 9 is a diagram illustrating a power converting apparatus according to still another embodiment of the present invention, and FIG. 10 illustrates operation of the power converting apparatus of FIG. 9.

Referring to FIGS. 9 and 10, the power converting apparatus 220a of FIG. 9 is similar to the power converting apparatus 220a of FIG. 5, except that the resistance values of the upper ON resistors Raon, Rbon, and Rcon are different from each other, and the resistance values of the lower ON resistors Ra'on, Rb'on and Rc'on are different from each other.

Since the resistance values of the lower ON resistors Ra'on, Rb'on and Rc'on are different from each other, different rising times T4, T5 and T6 are given when the plurality of lower switching devices S'a, S'b, and S'c is turned on, as shown in FIG. 10. Accordingly, the switching waveforms flowing through the plurality of lower switching devices S'a, S'b and S'c share a smaller overlapping portion, and therefore the EMI noise is attenuated.

Further, the resistance values of the upper ON resistors Raon, Rbon and Rcon and the lower ON resistors Ra'on, Rb'on and Rc'on are all different from each other, and therefore the rising times T1, T2, T3, T4, T5 and T6 may be different from each other as shown in FIG. 10. Accordingly, when the plurality of switching devices is turned on, the EMI noise is attenuated.

Figure 11A:
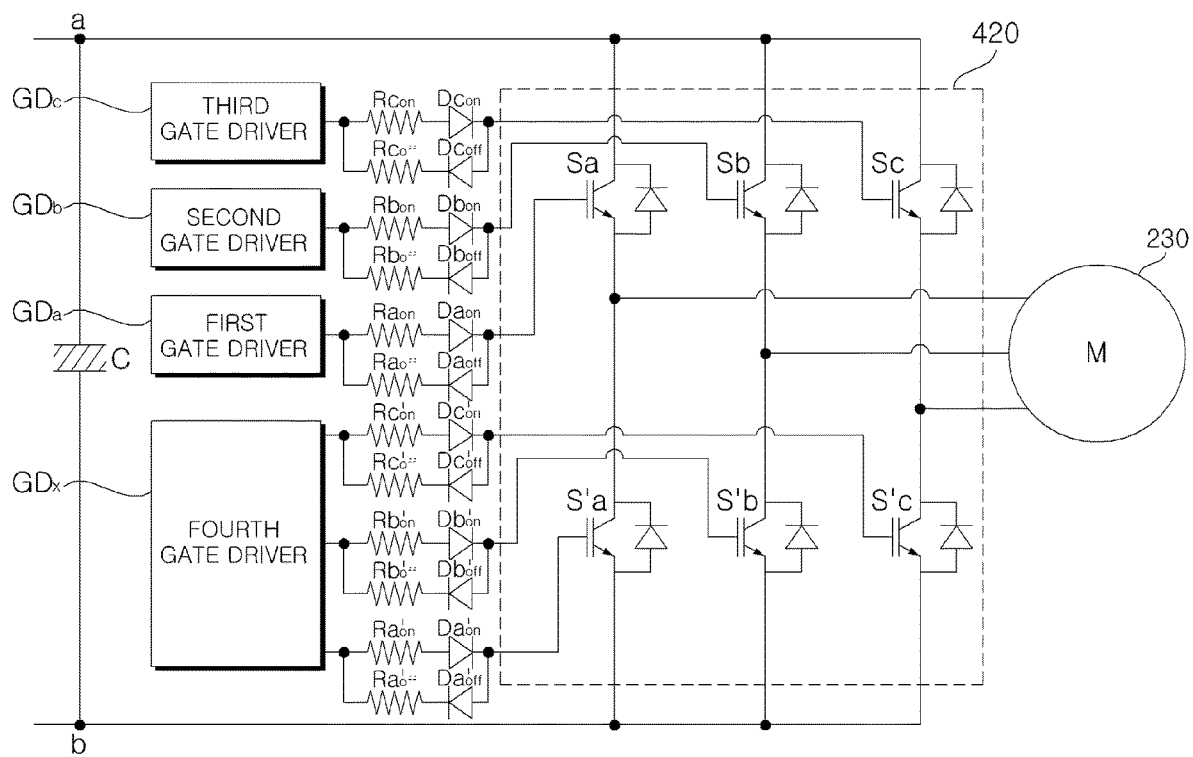
FIGS. 11A and 11B illustrate power converting apparatuses according to various embodiments of the present invention.
Figure 11B:
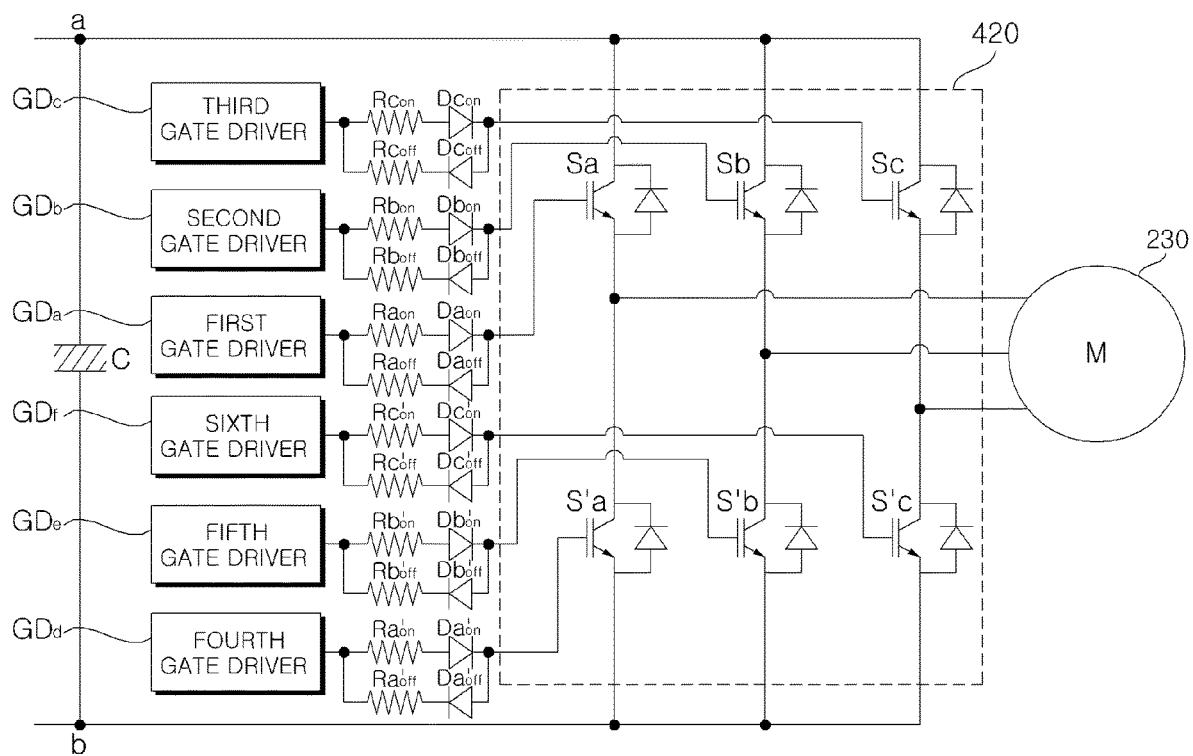
Figure 12:
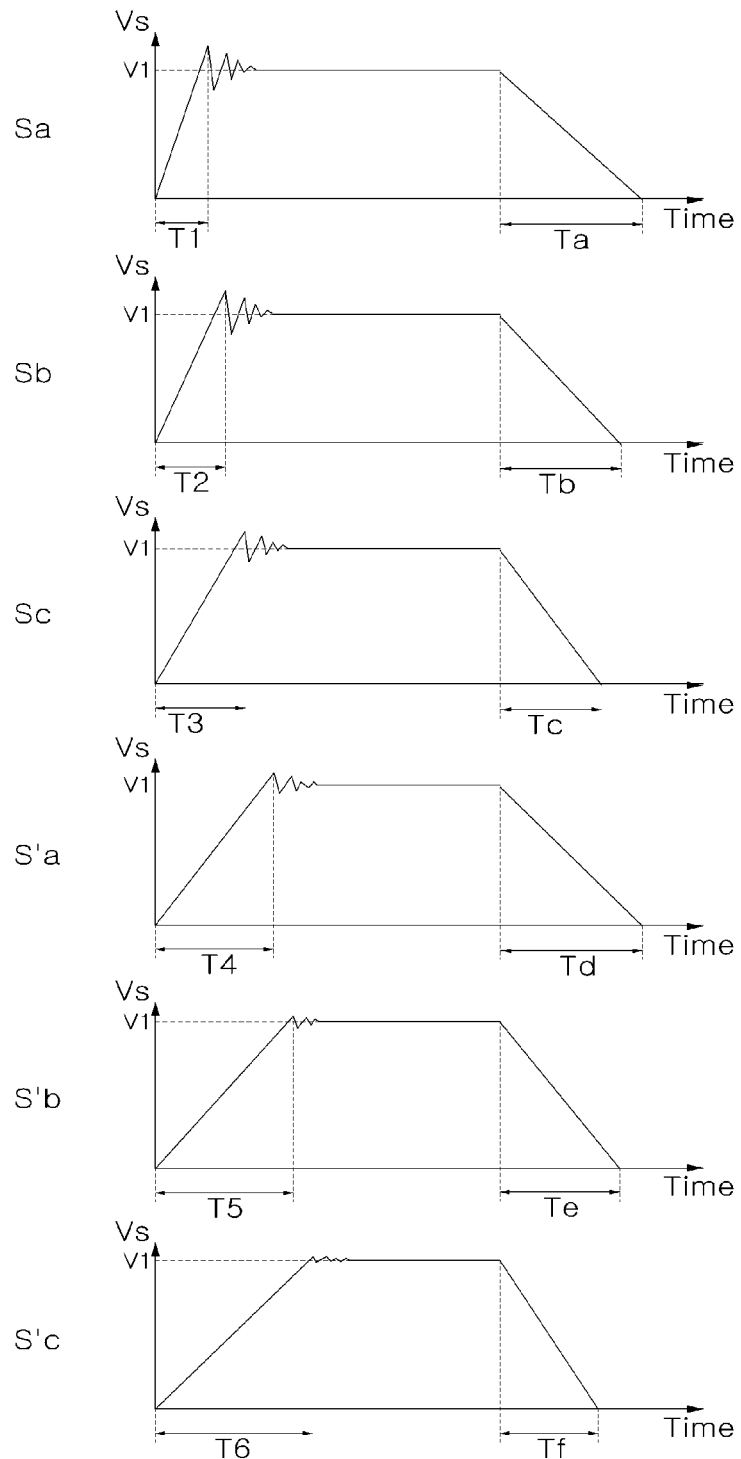
FIG. 12 illustrates operation of the power converting apparatus of FIG. 11A or 11B.

FIGS. 11A and 11B illustrate power converting apparatuses according to various embodiments of the present invention, and FIG. 12 illustrates operation of the power converting apparatus of FIG. 11A or 11B.

Referring to FIG. 11A, the power converting apparatus 220a of FIG. 11A is similar to the power converting apparatus 220a of FIG. 9, except that the plurality of upper ON resistors Raon, Rbon and Rcon, the plurality of lower ON resistors Ra'on, Rb'on and Rc'on, the plurality of upper OFF resistors Raoff, Rboff and Rcoff, and the plurality of lower OFF resistors Ra'off, Rb'off and Rc'off have different resistance values.

Accordingly, when the plurality of the upper switching switches Sa, Sb and Sc and the plurality of lower switching devices S'a, S'b and S'c are turned on, different rising times T1, T2, T3, T4, T5, and T6 may be given. As a result, the EMI noise is attenuated when the plurality of switching devices is turned on.

When the plurality of upper switching devices Sa, Sb and Sc and the plurality of lower switching devices S'a, S'b and S'c are turned off, different falling times Ta, Tb, Tc, Td, Te and Tf may be given. As a result, when the plurality of switching devices is turned off, the EMI noise is attenuated.

Similar to the power converting apparatus 220a of FIG. 11A, the power converting apparatus 220b of FIG. 11B is characterized in that the plurality of upper ON resistors Raon, Rbon and Rcon, the plurality of lower ON resistors Ra'on, Rb'on and Ra'on, the plurality of upper OFF resistors Raoff, Rboff and Rcoff, and the plurality of lower OFF resistors Ra'off, Rb'off and Rc'off have different resistance values.

On the other hand, the power converting apparatus 220b of FIG. 11B is different from the power converting apparatus 220a of FIG. 11A in that the gate terminals of the lower switching devices S'a, S'b and S'c are provided with a plurality of lower gate drivers GDd, GDe and GDf for outputting gate drive signals, respectively.

Accordingly, the plurality of lower ON resistors Ra'on, Rb'on and Rc'on may be disposed between the plurality of lower switching devices S'a, S'b and S'c and the plurality of lower gate drivers GDd, GDe and GDf.

The resistance values of the plurality of upper ON resistors Raon, Rbon and Rcon, a plurality of lower ON resistors Ra'on, Rb'on and Rc'on, the plurality of upper OFF resistors Raoff, Rboff and Rcoff and the plurality of lower OFF resistors Ra'off, Rb'off and Rc'off) described with reference to FIGS. 5 to 12 are all based on the assumption that the same switching frequency is given. Thus, by differing the resistance values from each other, the EMI noise may be attenuated.

The power converting apparatuses 220 described above is applicable to various electronic appliances. For example, the power converting apparatuses 220 is applicable to a laundry treating appliance, an air conditioner, a refrigerator, a water purifier, a cleaner, a vehicle, a robot and a drone among other home appliances. Hereinafter, various examples of home appliances to which the power converting apparatus 220 is applicable will be described.

Figure 13:
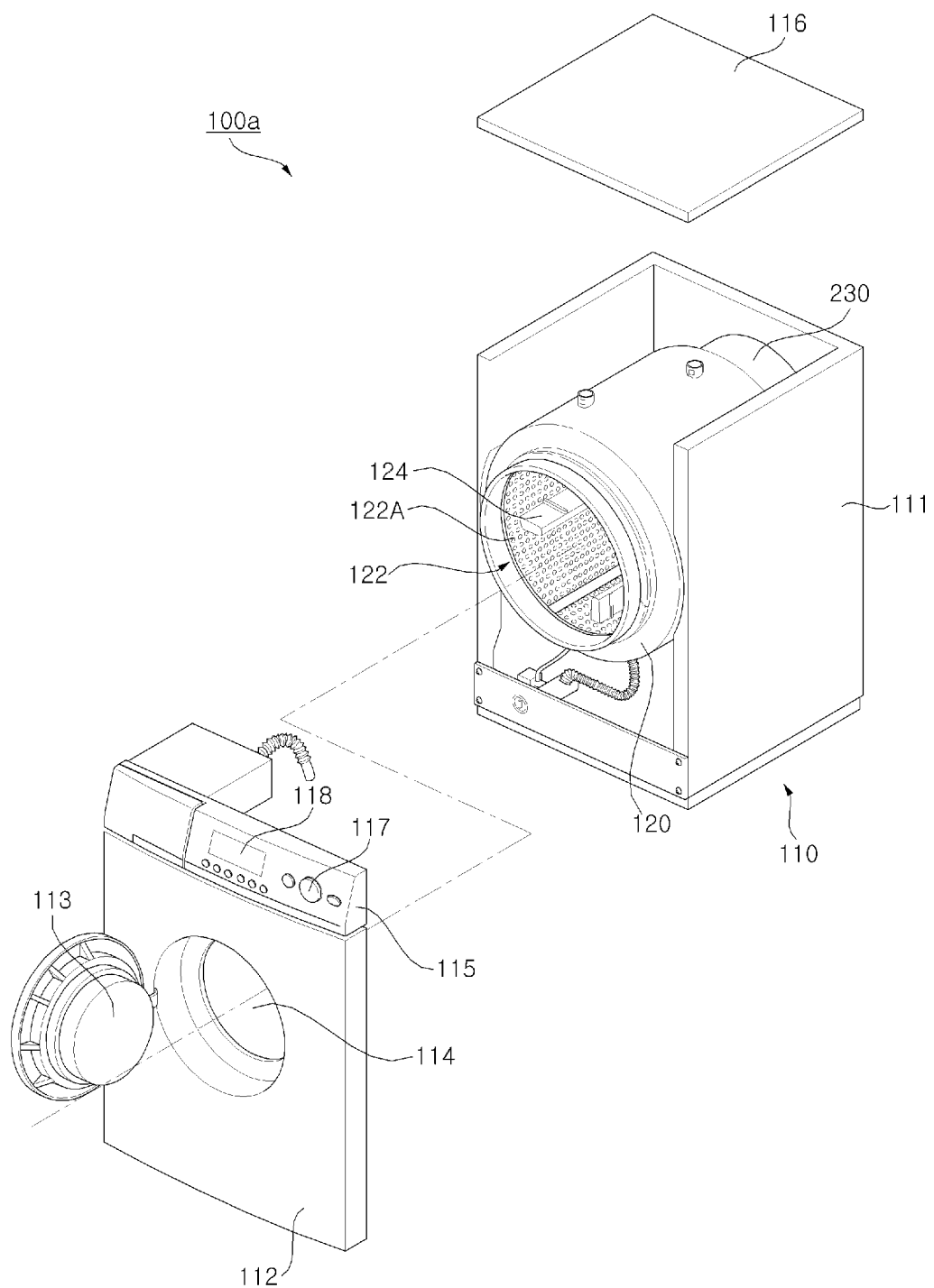
FIG. 13 is a perspective view illustrating a laundry treating appliance which is an exemplary home appliance according to an embodiment of the present invention.

FIG. 13 is a perspective view illustrating a laundry treating appliance according to an embodiment of the present invention.

Referring to FIG. 13, a laundry treating appliance 100a is a front-loading laundry treating appliance wherein laundry is inserted into a washtub from the front. The front-loading laundry treating appliance conceptually includes a washing machine for performing the operations of washing, rinsing and drying of inserted laundry or a dryer for drying inserted wet laundry. Hereinafter, description will be given focusing on the washing machine.

The laundry treating appliance 100a of FIG. 13, which is a washtub-based laundry treating appliance, includes a cabinet 110 defining the exterior of the laundry treating appliance 100a, a tub 120 disposed inside the cabinet 110 and supported by the cabinet 110, a washtub 122 which is disposed inside the tub 120 and in which laundry is washed, a motor 130 for driving the washtub 122, and a wash water supplier (not shown) disposed outside a cabinet body 111 to supply wash water into the cabinet 110, and a drainage unit (not shown) formed on the lower side of the tub 120 to discharge wash water outward.

The washtub 122 is provided with a plurality of through holes 122A allowing wash water to pass therethrough. A lifter 124 may be disposed on the inner surface of the washtub 122 to lift the laundry to a certain height during rotation such that the laundry falls due to gravity.

The cabinet 110 includes the cabinet body 111, a cabinet cover 112 disposed on and connected to the front surface of the cabinet body 111, a control panel 115 disposed on the upper side of the cabinet cover 112 and connected to the cabinet body 111, and a top plate 116 disposed on the upper side of the control panel 115 and connected to the cabinet body 111.

The cabinet cover 112 includes a laundry introduction hole 114 formed to allow introduction and retrieval of laundry therethrough and a door 113 disposed to be horizontally rotatable to open and close the laundry introduction hole 114.

The control panel 115 includes manipulation keys 117 for controlling the operation state of the laundry treating appliance 100a and a display unit 118 disposed on one side of the manipulation keys 117 to display the operation state of the laundry treating appliance 100a.

The manipulation keys 117 and the display unit 118 in the control panel 115 are electrically connected to a controller (not shown). The controller (not shown) electrically controls respective constituents of the laundry treating appliance 100a. Operation of the controller (not shown) will be described later.

The washtub 122 may be provided with an auto-balancer (not shown). The auto-balancer (not shown), which serves to attenuate vibration caused by maldistribution of laundry contained in the washtub 122, may be implemented by, for example, a liquid balancer or a ball balancer.

Although not shown in FIG. 9, the laundry treating appliance 100a may further include a vibration sensor for measuring the degree of vibration of the washtub 122 or the cabinet 110.

Figure 14:
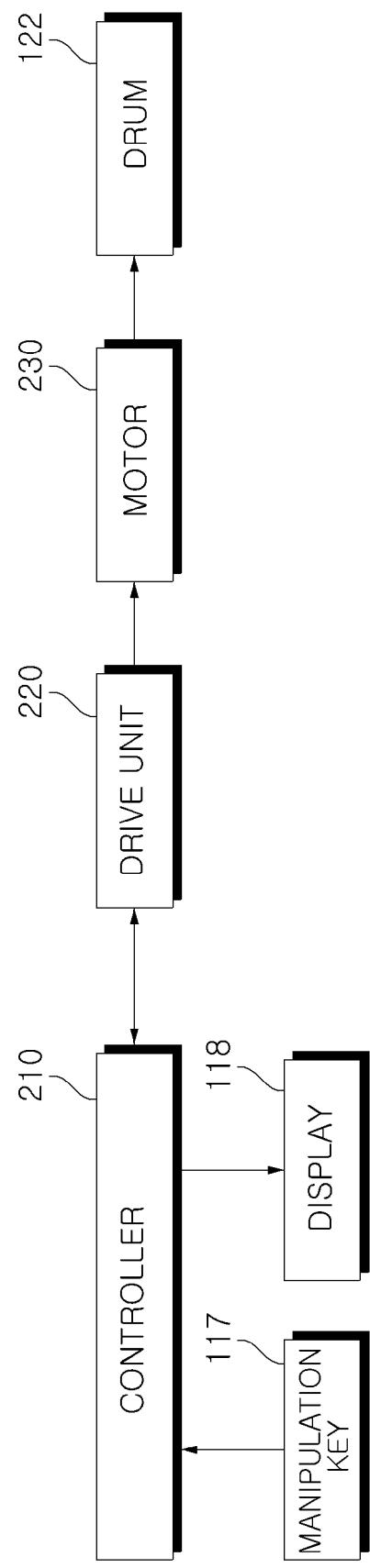
FIG. 14 is an internal block diagram of the laundry treating appliance of FIG. 13.

FIG. 14 is an internal block diagram of the laundry treating appliance of FIG. 13.

Referring to FIG. 14, in the laundry treating appliance 100a, the drive unit 220 is controlled by a controller 210. The drive unit 220 drives the motor 230. Thereby, the washtub 122 is rotated by the motor 230.

The controller 210 operates according to an operation signal received from the manipulation key 117. Thereby, washing, rinsing and drying may be performed.

In addition, the controller 210 may control the display 118 to display a washing mode, a washing time, a drying time, a rinsing time, or the current operation state.

The controller 210 controls the drive unit 220 to operate the motor 230. In this case, a position sensor for sensing the position of the rotor of the motor 230 is not provided to either the interior or the exterior of the motor 230. That is, the drive unit 220 controls the motor 230 in a sensorless manner.

The drive unit 220, which serves to drive the motor 230, may include an inverter (not shown), an inverter controller (not shown), an output current detector E (see FIG. 2) for detecting an output current flowing through the motor 230, and an output voltage detector F (see FIG. 2) for detecting an output voltage vo applied to the motor 230. The drive unit 220 may conceptually further include a converter for supplying DC power to be input to the inverter (not shown).

For example, the inverter controller 430 (see FIG. 2) estimates the position of the rotor of the motor 230 based on an output current idc and the output voltage vo. Then, the drive unit 220 controls the motor 230 based on the estimated position of the rotor such that the motor 230 rotates.

Specifically, when the inverter controller 430 (see FIG. 2) generates a PWM switching control signal Sic (see FIG. 2) based on the output current io and the output voltage vo and outputs the same to the inverter (not shown), the inverter (not shown) supplies AC power of a predetermined frequency to the motor 230. Then, the motor 230 is caused to rotate by the AC power of the predetermined frequency.

The drive unit 220 may correspond to the power converting apparatus 220 of FIG. 1.

The controller 210 may sense the amount of laundry based on, for example, the output current idc flowing through the motor 230. For example, while the washtub 122 is rotating, the controller 210 may sense the amount of laundry based on the current value idc of the motor 230.

Particularly, the controller 210 may accurately sense the amount of laundry using the rotor resistance and inductance of the motor measured in a motor alignment interval.

The controller 210 may sense the degree of maldistribution of the washtub 122, i.e., unbalance (UB) of the washtub 122. Sensing the degree of maldistribution may be performed based on a ripple component of the output current idc flowing through the motor 230 or change in the rate of rotation of the washtub 122.

Particularly, the controller 210 may accurately sense the amount of laundry using the rotor resistance and inductance of the motor measured in a motor alignment interval.

Figure 15:
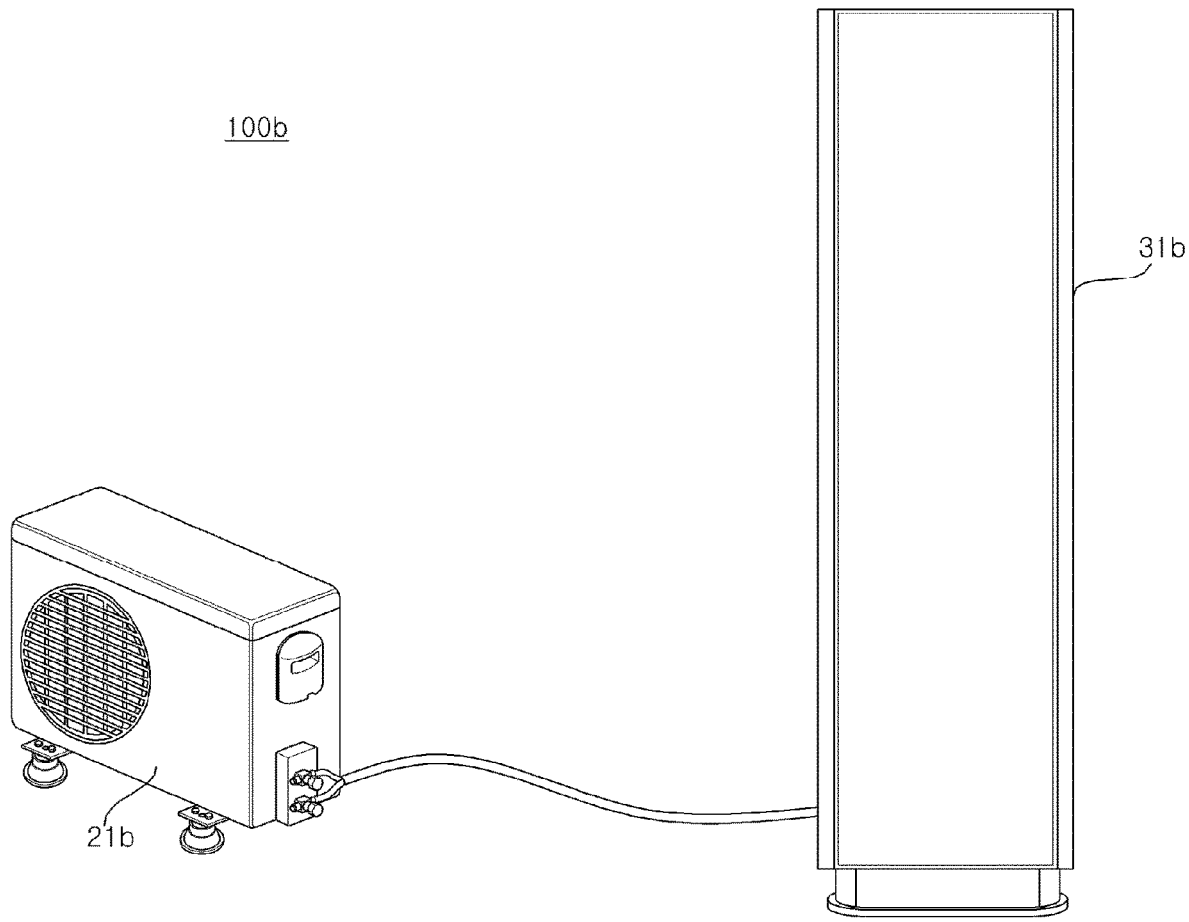
FIG. 15 is a view illustrating configuration of an air conditioner which is another exemplary home appliance according to an embodiment of the present invention.

FIG. 15 is a view illustrating configuration of an air conditioner which is another exemplary home appliance according to an embodiment of the present invention.

According to an embodiment, the air conditioner 100*b* may include an indoor unit 31*b* and an outdoor unit 21*b* connected to the indoor unit 31*b*, as shown in FIG. 15.

As the indoor unit 31*b*, any one of a standing indoor unit, a wall-mounted indoor unit and a ceiling-mounted indoor unit may be employed. In FIG. 11, the indoor unit 31*b* is a standing indoor unit.

The air conditioner 100*b* may further include at least one of a ventilator, an air cleaner, a humidifier and a heater, which may operate in connection with operations of the indoor unit and the outdoor unit.

The outdoor unit 21*b* includes a compressor (not shown) for compressing a refrigerant supplied thereto, an outdoor heat exchanger (not shown) causing heat exchange between the refrigerant and the outdoor air, an accumulator (not shown) for extracting a gaseous refrigerant from the supplied refrigerant and supplying the same to the compressor, and a 4-way valve (not shown) for selecting a flow path of the refrigerant according to the heating operation. The outdoor unit 21*b* further includes a plurality of sensors, a valve and an oil collector, which will not be described below.

The outdoor unit 21*b* operates the compressor and the outdoor heat exchanger provided to the outdoor unit 21*b* to compress the refrigerant or cause heat exchange according to the settings to supply the refrigerant to the indoor unit 31*b*. The outdoor unit 21*b* may be driven by a remote controller (not shown) or according to a request from the indoor unit 31*b*. As the cooling/heating capacity depends on the indoor unit, the number of operations of the outdoor unit and the number of operations of the compressor installed in the outdoor unit are changeable.

The outdoor unit 21*b* supplies the compressed refrigerant to the indoor unit 31*b* connected thereto.

The indoor unit 31*b* receives the refrigerant from the outdoor unit 21*b* and discharges cooled air to the indoor space. The indoor unit 31*b* includes an indoor heat exchanger (not shown), an indoor unit fan (not shown), an expansion valve (not shown) for expanding the supplied refrigerant, and multiple sensors (not shown).

The outdoor unit 21*b* and the indoor unit 31*b* are connected through a communication line to exchange data. The outdoor unit and the indoor unit may be connected to a remote control (not shown) by wire or wirelessly. Thereby, operations of the outdoor unit and the indoor unit may be controlled by the remote control (not shown).

The remote control (not shown) is connected to the indoor unit 31*b* to input a control command of the user to the indoor unit. The remote control may receive and display the state information about the indoor unit. The remote control may communicate with the indoor unit by wire or wirelessly.

Figure 16:
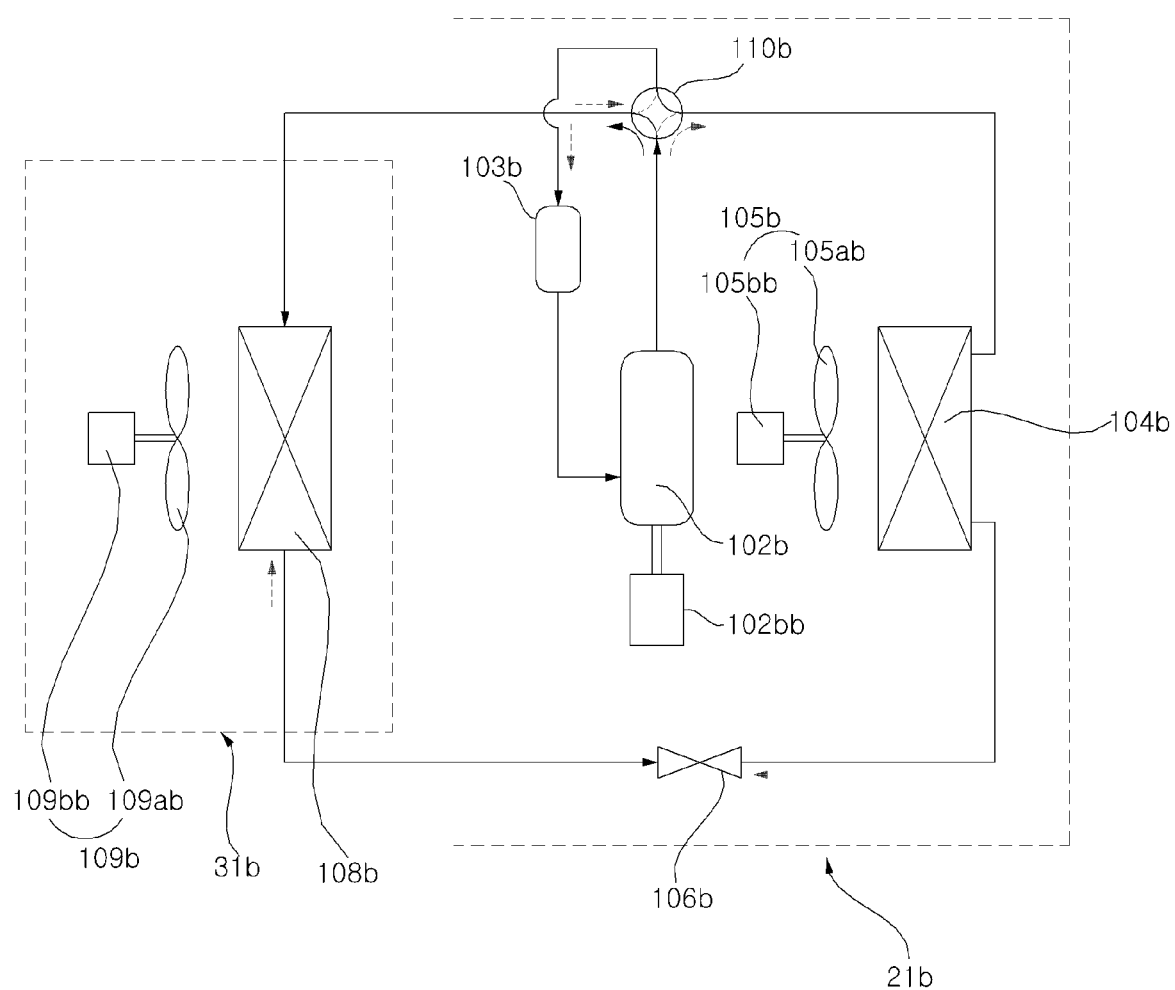
FIG. 16 is a schematic diagram illustrating the outdoor unit and the indoor unit of FIG. 15.

FIG. 16 is a schematic diagram illustrating the outdoor unit and the indoor unit of FIG. 15.

Referring to FIG. 12, the air conditioner 100*b* is broadly divided into the indoor unit 31*b* and the outdoor unit 21*b*.

The outdoor unit 21*b* includes a compressor 102*b* serving to compress the refrigerant, a compressor motor 102*bb* for driving the compressor, an outdoor heat exchanger 104*b* serving to dissipate heat from the compressed refrigerant, an outdoor air blower 105*b* including an outdoor fan 105*ab* disposed on one side of the outdoor heat exchanger 104*b* to support heat dissipation from the refrigerant and a motor 105*bb* for rotating the outdoor fan 105*ab*, an expansion mechanism 106*b* for expanding the condensed refrigerant, a cooling/heating switching valve 110*b* for switching between flow paths of the compressed refrigerant, and an accumulator 103*b* for temporarily storing the evaporated refrigerant, removing moisture and foreign substances from the stored refrigerant, and then supplying the refrigerant of a constant pressure to the accumulator 103*b*.

The indoor unit 31*b* includes an indoor heat exchanger 108*b* disposed in the indoor space to perform the cooling/heating functions and an indoor air blower 109*b* including an indoor fan 109*ab* disposed on one side of the indoor heat exchanger 109*b* to support heat dissipation from the refrigerant and a motor 109*bb* for rotating the indoor fan 109*ab*.

At least one indoor heat exchanger 108*b* may be installed. As the compressor 102*b*, at least one of an inverter compressor and a constant speed compressor may be employed.

The air conditioner 100*b* may be configured as an air cooler for cooling the indoor space or as a heat pump for cooling or heating the indoor space.

The compressor 102*b* in the outdoor unit 21*b* of FIG. 15 may be driven by a power converting apparatus for driving a compressor motor 250*b*, such as the power converting apparatus of FIG. 1.

Alternatively, the indoor fan 109*ab* or the outdoor fan 105*ab* may be driven by a power converting apparatus for driving an indoor fan motor 109*bb* or an outdoor fan motor 150*bb*, such as the power converting apparatus of FIG. 1.

Figure 17:
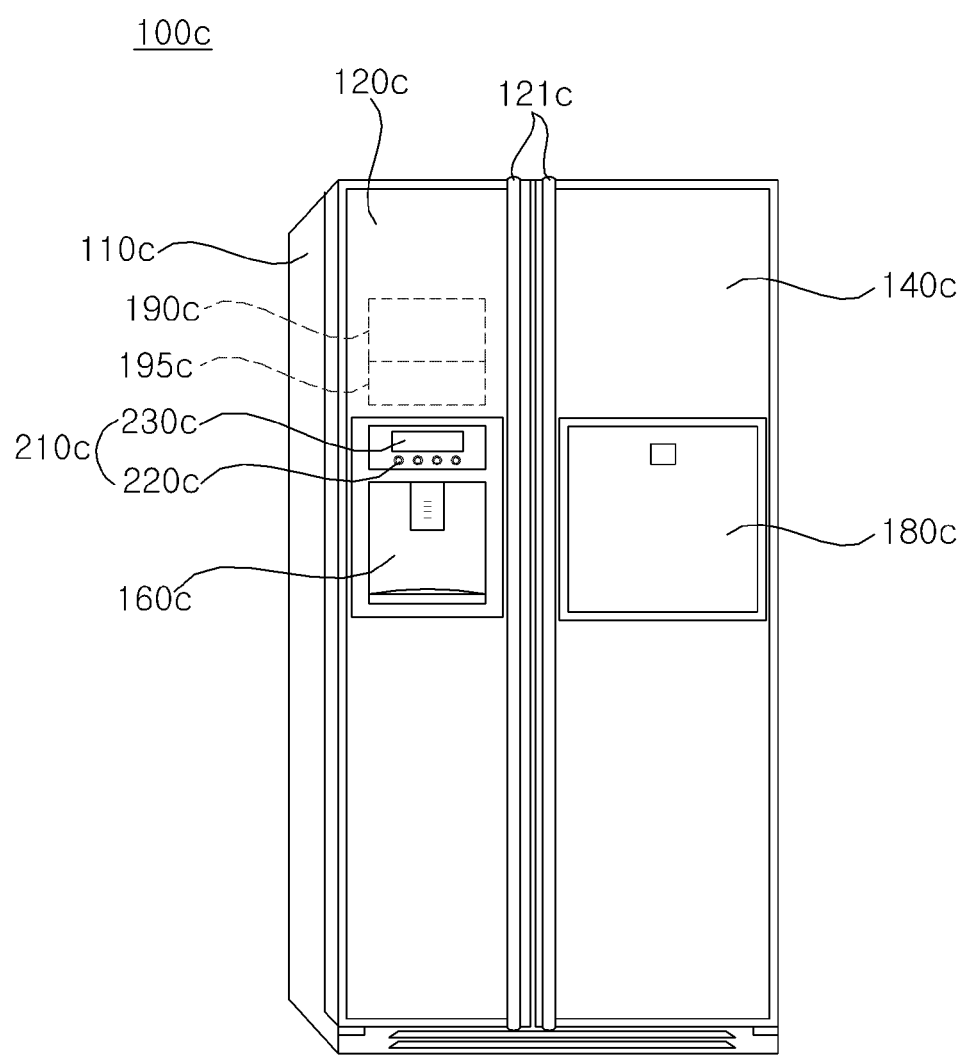
FIG. 17 is a perspective view illustrating a refrigerator which is another exemplary home appliance according to an embodiment of the present invention.

FIG. 17 is a perspective view illustrating a refrigerator which is another exemplary home appliance according to an embodiment of the present invention.

Referring to FIG. 17, the overall exterior of a refrigerator 100*c* related to the present invention is defined by a case 110*c* having an inner space partitioned into a freezer compartment and a cooling compartment, which are not shown, a freezer compartment door 120*c* for shielding the freezer compartment, and a cooling compartment door 140*c* for shielding the cooling compartment.

The front surfaces of the freezer compartment door 120c and the cooling compartment door 140c are provided with door handles 121c protruding forwards such that the user can easily grip the door handles 121c to rotate the freezer compartment door 120c and the cooling compartment door 140c.

The front surface of the cooling compartment door 140c may be further provided with a home bar 180c, which is a convenience means allowing the user to take out a stored item such as a beverage without opening the cooling compartment door 140c.

The front surface of the freezer compartment door 120c may be further provided with a dispenser 160c, which is a convenience means allowing the user to take out ice or drinking water without opening the freezer compartment door 120c. A control panel 210c for controlling operation of the refrigerator 100c and displaying the operation state of the refrigerator 100c may be provided on the upper side of the dispenser 160c.

While the dispenser 160c is illustrated as being disposed on the front surface of the freezer compartment door 120c, embodiments of the present invention are not limited thereto. The dispenser 160c may be disposed on the front surface of the cooling compartment door 140c.

Meanwhile, the inner upper portion of the freezer compartment (not shown) may be provided with an icemaker 190c for making ice out of the supplied water using cold air in the freezer compartment and an ice bank 195c installed inside the freezer compartment (not shown) to contain separated ice cubes made by the icemaker. Although not shown in the figure, an ice chute (not shown) for guiding ice falling from the ice bank 195c into the dispenser 160c may be further provided.

The control panel 210c may include an input unit 220c comprising multiple buttons and a display unit 230c for displaying a control window and an operation state.

The display unit 230c displays a control window, an operation state and information such as a temperature in the refrigerator. For example, the display unit 230c may display a service mode (ice cubes, water, crushed ice) of the dispenser, a set temperature of the freezer compartment, and a set temperature of the cooling compartment.

The display unit 230c may be implemented as, for example, a liquid crystal display (LCD), light emitting diodes (LEDs), and organic light emitting diodes (OLEDs). The display unit 230c may also be implemented as a touchscreen capable of performing the function of the input unit 220c.

The input unit 220c may be provided with multiple manipulation buttons. For example, the input unit 220c may include a dispenser setting button (not shown) for setting a service mode (ice cubes, water, chipped ice, etc.) of the dispenser, a freezer compartment temperature setting button (not shown) for setting the temperature of the freezer compartment, and a cooling compartment temperature setting button (not shown) for setting the temperature of the cooling compartment. The input unit 220c may be implemented by a touchscreen capable of performing the function of the display unit 230c.

The refrigerator according to embodiments of the present invention is not limited to the illustrated double door type refrigerator. The refrigerator may be any type of refrigerator including one door type, sliding door type, and curtain door type.

Figure 18:
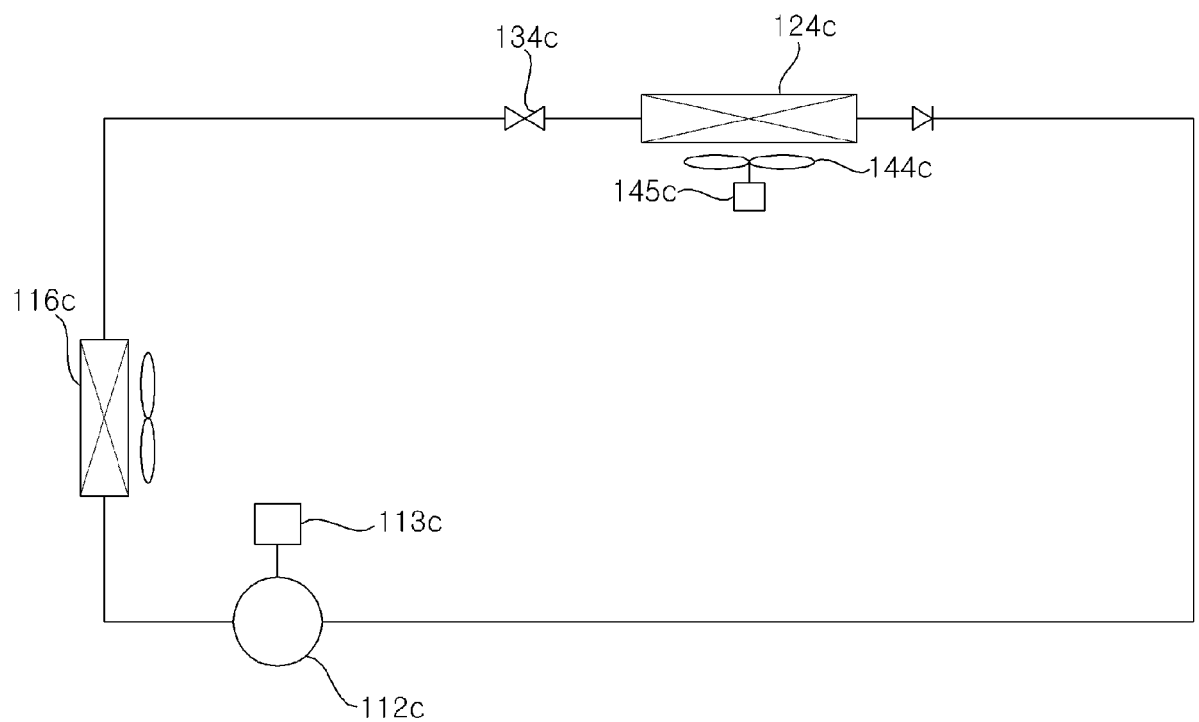
FIG. 18 is a diagram schematically illustrating the configuration of the refrigerator of FIG. 17.

FIG. 18 is a diagram schematically illustrating configuration of the refrigerator of FIG. 17.

Referring to FIG. 18, the refrigerator 100c may include a compressor 112c, a condenser 116c for condensing a refrigerant compressed by the compressor 112c, a freezer compartment evaporator 124c disposed on the freezer compartment (not shown) to evaporate the condensed refrigerant supplied from the condenser 116c, and a freezer compartment expansion valve 134c for expanding the refrigerant supplied from the freezer compartment evaporator 124c.

While FIG. 18 illustrates that one evaporator is used, each of the cooling compartment and the freezer compartment may employ an evaporator.

That is, the refrigerator 100c may further include a cooling compartment evaporator (not shown) disposed on the cooling compartment (not shown), a 3-way valve (not shown) for supplying the refrigerant condensed by the condenser 116c to the cooling compartment evaporator (not shown) or the freezer compartment evaporator 124c, and a cooling compartment expansion valve (not shown) for expanding the refrigerant supplied to the cooling compartment evaporator (not shown).

The refrigerator 100c may further include a liquid-gas separator (not shown) in which the refrigerant from the evaporator 124c is separated into liquid and gas.

The refrigerator 100c may further include a cooling compartment fan (not shown) and a freezer compartment fan 144c, which suction cold air arriving via the freezer compartment evaporator 124c and supply the same to the cooling compartment (not shown) and the freezer compartment (not shown).

The refrigerator 100c may further include a compressor drive unit 113c for driving the compressor 112c, a cooling compartment drive unit (not shown) for driving the cooling compartment fan (not shown), and a freezer compartment fan drive unit 145c for driving the freezer compartment fan 144c.

Referring to FIG. 16, the evaporator 124c is used for both the cooling compartment and the freezer compartment. In this case, a damper (not shown) may be installed between the cooling compartment and the freezer compartment, and the fan (not shown) may forcibly blow the air cooled by the evaporator to the freezer compartment and the cooling compartment.

The compressor 112c of FIG. 18 may be driven by a power converting apparatus for driving the compressor motor, such as the power converting apparatus of FIG. 1.

Alternatively, the cooling compartment fan (not shown) or the freezer compartment fan 144c may be driven by a power converting apparatus for driving the cooling compartment fan motor (not shown) or the freezer compartment fan motor (not shown), such as the power converting apparatus of FIG. 1.

A power converting apparatus and a home appliance having the same according to embodiments of the present invention are not limited to configurations and methods of the embodiments described above. Variations may be made to the embodiments described above by selectively combining all or some of the embodiments.

A motor driving method and a method for operating a home appliance according to the present invention are implementable by processor-readable code on a recording medium which can be read by a processor provided to the power converting apparatus or home appliance. The recording medium readable by the processor includes all kinds of recording devices for storing data which can be read by the processor.

As is apparent from the above description, the present invention has the following effects.

According to an embodiment of the present invention, a power converting apparatus and a home appliance having the same include an inverter having a plurality of upper switching devices and a plurality of lower switching devices, a plurality of upper gate drivers to output a gate drive signal to each of gate terminals of the plurality of upper switching devices, and a plurality of upper ON resistors disposed between the plurality of upper switching devices and the plurality of upper gate drivers, wherein resistance values of the upper ON resistors are different from each other. Thus, the EMI noise generated when the inverter is turned on or off may be attenuated without changing the switching frequency.

In particular, when the plurality of upper switching devices is turned on, the rising times of the switching waveforms by the plurality of upper ON resistors are set to be different from each other, and accordingly the EMI noise generated in the switching waveforms is attenuated.

The power converting apparatus and a home appliance further include a plurality of upper OFF resistors connected to both ends of each of the upper ON resistors, respectively. If the resistance values of the upper OFF resistors are different from each other, the falling times of the switching waveforms by the plurality of upper OFF resistors are set to be different from each other when the plurality of upper switching devices is turned off. Thereby, the EMI noise generated in the switching waveforms is attenuated.

The power converting apparatus and a home appliance further include a plurality of lower ON resistors disposed between the plurality of lower switching devices and the lower gate driver. If the resistance values of the lower ON resistors are different from each other, the rising times of the switching waveforms by the plurality of lower ON resistors are set to be different from each other when the plurality of lower switching devices is turned on. Thereby, the EMI noise generated in the switching waveforms is attenuated.

The power converting apparatus and a home appliance further include a plurality of lower OFF resistors connected to both ends of each of the lower ON resistors, respectively. If the resistance values of the lower OFF resistors are different from each other, the falling times of the switching waveforms by the plurality of lower OFF resistors are set to be different from each other when the plurality of lower switching devices is turned off. Thereby, the EMI noise generated in the switching waveforms is attenuated.

According to another embodiment of the present invention, a power converting apparatus and a home appliance having the same include an inverter having a plurality of upper switching devices and a plurality of lower switching devices, a plurality of upper gate drivers to output a gate drive signal to each of gate terminals of the plurality of upper switching devices, a plurality of upper ON resistors disposed between the plurality of upper switching devices and the plurality of upper gate drivers, and a plurality of upper OFF resistors connected to both ends of each of the upper ON resistors, wherein a resistance value of an upper ON resistor and a resistance value of an upper OFF resistor corresponding to at least one of the upper switching devices are different from each other. Thus, the EMI noise generated when the inverter is turned on or off may be attenuated without changing the switching frequency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power converting apparatus comprising:
   an inverter having a plurality of upper switching devices and a plurality of lower switching devices;
   a plurality of upper gate drivers to output a gate drive signal to each of gate terminals of the plurality of upper switching devices;
   a plurality of upper ON resistors disposed between the plurality of upper switching devices and the plurality of upper gate drivers; and
   a plurality of upper OFF resistors connected to both ends of each of the upper ON resistors, respectively,
   wherein resistance values of the upper ON resistors are different from each other,
   wherein a first rising time of switching waveform of a first upper switching device among the plurality of upper switching devices is shorter than a first falling time of switching waveform of the first upper switching device,
   wherein a second rising time of switching waveform of a second upper switching device among the plurality of upper switching devices is longer than the first rising time,
   wherein a second falling time of switching waveform of the second upper switching device is shorter than the first falling time and is longer than the second rising time,
   wherein a third rising time of switching waveform of a third upper switching device among the plurality of upper switching devices is longer than the second rising time, and
   wherein a third falling time of switching waveform of the third upper switching device is shorter than the second falling time.

2. The power converting apparatus according to claim 1, wherein resistance values of the upper OFF resistors are equal to each other.

3. The power converting apparatus according to claim 1, wherein resistance values of the upper OFF resistors are different from each other.

4. The power converting apparatus according to claim 1, wherein the resistance value of the plurality of upper ON resistors is different from resistance values of the upper OFF resistors.

5. The power converting apparatus according to claim 1, further comprising:
   a lower gate driver to output a gate drive signal to gate terminals of the plurality of lower switching devices; and
   a plurality of lower ON resistors disposed between the plurality of lower switching devices and the lower gate driver.

6. The power converting apparatus according to claim 5, wherein resistance values of the lower ON resistors are equal to each other.

7. The power converting apparatus according to claim 5, wherein resistance values of the lower ON resistors are different from each other.

8. The power converting apparatus according to claim 7, further comprising:
   a plurality of lower OFF resistors connected to both ends of each of the lower ON resistors, respectively,
   wherein resistance values of the lower OFF resistors are different from each other.

9. The power converting apparatus according to claim 1, further comprising:

a plurality of lower gate drivers to output a gate drive signal to each of gate terminals of the plurality of lower switching devices; and a plurality of lower ON resistors disposed between the plurality of lower switching devices and the plurality of lower gate drivers.

10. The power converting apparatus according to claim 9, wherein resistance values of the lower ON resistors are equal to each other.

11. The power converting apparatus according to claim 9, wherein resistance values of the lower ON resistors are different from each other.

12. The power converting apparatus according to claim 11, further comprising:

a plurality of lower OFF resistors connected to both ends of each of the lower ON resistors, wherein resistance values of the lower OFF resistors are different from each other.

13. A power converting apparatus comprising:

an inverter having a plurality of upper switching devices and a plurality of lower switching devices;

a plurality of upper gate drivers to output a gate drive signal to each of gate terminals of the plurality of upper switching devices;

a plurality of upper ON resistors disposed between the plurality of upper switching devices and the plurality of upper gate drivers; and a plurality of upper OFF resistors connected to both ends of each of the upper ON resistors, wherein a resistance value of an upper ON resistor and a resistance value of an upper OFF resistor corresponding to at least one of the upper switching devices are different from each other, wherein a first rising time of switching waveform of a first upper switching device among the plurality of upper switching devices is shorter than a first falling time of switching waveform of the first upper switching device, wherein a second rising time of switching waveform of a second upper switching device among the plurality of upper switching devices is longer than the first rising time, wherein a second falling time of switching waveform of the second upper switching device is shorter than the first falling time and is longer than the second rising time, wherein a third rising time of switching waveform of a third upper switching device among the plurality of upper switching devices is longer than the second rising time, and wherein a third falling time of switching waveform of the third upper switching device is shorter than the second falling time.

14. A home appliance comprising:

a motor; and a power converting apparatus to supply converted power to the motor, wherein the power converting apparatus comprises:

an inverter having a plurality of upper switching devices and a plurality of lower switching devices;

a plurality of upper gate drivers to output a gate drive signal to each of gate terminals of the plurality of upper switching devices;

a plurality of upper ON resistors disposed between the plurality of upper switching devices and the plurality of upper gate drivers, wherein a first rising time of switching waveform of a first upper switching device among the plurality of upper switching devices is shorter than a first falling time of switching waveform of the first upper switching device, wherein a second rising time of switching waveform of a second upper switching device among the plurality of upper switching devices is longer than the first rising time, wherein a second falling time of switching waveform of the second upper switching device is shorter than the first falling time and is longer than the second rising time, wherein a third rising time of switching waveform of a third upper switching device among the plurality of upper switching devices is longer than the second rising time, and wherein a third falling time of switching waveform of the third upper switching device is shorter than the second falling time.

15. The home appliance according to claim 14, wherein the power converting apparatus further comprises:

a lower gate driver to output a gate drive signal to gate terminals of the plurality of lower switching devices; and a plurality of lower ON resistors disposed between the plurality of lower switching devices and the lower gate driver.

16. The home appliance according to claim 15, wherein resistance values of the lower ON resistors are different from each other, wherein the power converting apparatus further comprises a plurality of lower OFF resistors connected to both ends of each of the lower ON resistors, respectively, wherein resistance values of the lower OFF resistors are different from each other.

17. The home appliance according to claim 14, wherein the power converting apparatus further comprises:

a plurality of lower gate drivers to output a gate drive signal to each of gate terminals of the plurality of lower switching devices; and a plurality of lower ON resistors disposed between the plurality of lower switching devices and the plurality of lower gate drivers.

18. The home appliance according to claim 17, wherein resistance values of the lower ON resistors are different from each other, wherein the power converting apparatus further comprises a plurality of lower OFF resistors connected to both ends of each of the lower ON resistors, wherein resistance values of the lower OFF resistors are different from each other.

* * * * *